US012057019B2

(12) United States Patent
Chen et al.

(10) Patent No.: US 12,057,019 B2
(45) Date of Patent: Aug. 6, 2024

(54) METHOD FOR VESSEL TRAFFIC PATTERN RECOGNITION VIA DATA QUALITY CONTROL AND DATA COMPRESSION

(71) Applicants: Shanghai Maritime University, Shanghai (CN); Shanghai Ship and Shipping Research Institute, Shanghai (CN)

(72) Inventors: Xinqiang Chen, Shanghai (CN); Qiuying Wang, Shanghai (CN); Yongsheng Yang, Shanghai (CN); Bing Han, Shanghai (CN); Zhongdai Wu, Shanghai (CN); Huafeng Wu, Shanghai (CN); Yang Sun, Shanghai (CN); Chaofeng Li, Shanghai (CN); Jiangfeng Xian, Shanghai (CN); Wei Liu, Shanghai (CN)

( * ) Notice: Subject to any disclaimer, the term of this patent is extended or adjusted under 35 U.S.C. 154(b) by 25 days.

(21) Appl. No.: 17/976,816

(22) Filed: Oct. 30, 2022

(65) Prior Publication Data

US 2023/0222919 A1 Jul. 13, 2023

(30) Foreign Application Priority Data

Jan. 11, 2022 (CN) ............................ 202210026085

(51) Int. Cl.
*G08G 3/02* (2006.01)

(52) U.S. Cl.
CPC ..................................... *G08G 3/02* (2013.01)

(58) Field of Classification Search
CPC ................................... G08G 3/02; G08G 3/00
See application file for complete search history.

(56) References Cited

U.S. PATENT DOCUMENTS

| | | | | |
|---|---|---|---|---|
| 7,308,343 | B1 | 12/2007 | Horvath et al. | |
| 7,965,223 | B1 | 6/2011 | McCusker | |
| 9,727,976 | B1 * | 8/2017 | Perkins | G06V 20/13 |
| 10,041,802 | B1 | 8/2018 | Dorfmann et al. | |
| 10,048,075 | B2 * | 8/2018 | Wang | G01C 21/20 |
| 10,502,579 | B2 * | 12/2019 | Fowe | G01C 21/3676 |
| 10,902,337 | B1 * | 1/2021 | Tang | G06F 18/23 |
| 11,851,147 | B2 * | 12/2023 | Ma | G08G 3/00 |
| 2022/0171796 | A1 * | 6/2022 | Du | B60R 25/102 |
| 2022/0326022 | A1 * | 10/2022 | Li | G01C 21/28 |
| 2022/0398448 | A1 * | 12/2022 | Jayaraman | G06N 3/044 |

* cited by examiner

*Primary Examiner* — John A Tweel, Jr.
(74) *Attorney, Agent, or Firm* — Rahman LLC

(57) ABSTRACT

The present invention provides a vessel traffic pattern identification method via data quality control and data compression, and includes the steps of assorting a collection of Automatic Identification System (AIS) data points according to Maritime Mobile Service Identity (MMSI) code; sorting each collection result by time ascending order; deleting duplicated vessel AIS data points considering time stamp, latitude, longitude and vessel speed over ground; segmenting vessel trajectories; obtaining high-quality AIS data with an AIS data anomaly detection; repairing and compressing each vessel trajectory with the Douglas-Peucker algorithm; clustering vessel trajectories with the Quick Bundles algorithm; and identifying a maritime traffic pattern. The invention can efficiently identify vessel traffic patterns and help maritime traffic management departments to accurately identify a traffic situation.

1 Claim, 13 Drawing Sheets

$d_f(P,Q)$

METHOD FOR VESSEL TRAFFIC PATTERN RECOGNITION VIA DATA QUALITY CONTROL AND DATA COMPRESSION

CROSS-REFERENCE TO RELATED APPLICATION

The subject application claims priority on Chinese patent application CN202210026085.5 filed on Jan. 12, 2022, the contents and subject matter thereof being incorporated herein by reference.

FIELD OF INVENTION

The present invention relates to a field of maritime traffic safety technology, and specifically refers to a method for vessel traffic pattern recognition via data quality control and data compression.

BACKGROUND ART

Traffic pattern recognition technology refers to extracting maritime traffic patterns from vessel trajectory data, which supports traffic demand analysis, traffic planning, traffic management, etc. The AIS (Automatic Identification System) data contains vessel trajectory information supports for accurate traffic pattern exploitation studies and efficient traffic management and controlling. The raw AIS data may contain anomaly data during data transmission and storing procedure. Besides, the AIS dataset becomes larger and larger due to the increase volume of goods transmission with vessels. The huge amount of AIS data challenges the data storage, query, transmission and traffic pattern exploitation, etc. Conventional data mining-based techniques may require large time cost and computational cost to identify the vessel traffic pattern with the large-scale AIS data. There is a desire in the industry to explore vessel trajectory data patterns in a quick yet efficient manner. Data preprocessing is usually implemented to correct out abnormal AIS data, and then varied data mining methods are performed to obtain traffic patterns from the cleaned dataset.

SUMMARY OF THE INVENTION

The purpose of the invention aims to provide a vessel traffic pattern recognition method to explore primary traffic patterns in inland waterways. The invention introduces a novel framework to identify the maritime traffic pattern with less time cost compared to the conventional pattern recognition method. The invention proposes a method for vessel traffic pattern recognition via data quality control and data compression.

The method for vessel traffic pattern recognition via data quality control and data compression comprises the following steps:

(1) assorting a collection of AIS data points according to MMSI and sorting each collection result by time ascending order; deleting duplicative AIS data points and segmenting vessel trajectories: allocating each AIS data point in a collection to a vessel trajectory $trajectory_z$ so that each point therein having a same MMSI, and sorting each vessel trajectory $trajectory_z$ by time ascending order, thus obtaining a set of vessel trajectories trajectory=$\{trajectory_z\}$, z=1, 2, 3, . . . , v, wherein $trajectory_z$ denoting a zth vessel trajectory, with each AIS data point of a vessel trajectory $trajectory_z$ represented by e={MMSI, Time, lon, lat, sog}, MMSI denoting a Maritime Mobile Service Identity of vessel, Time denoting a time stamp, lon denoting a longitude, lat denoting a latitude, and sog denoting a vessel speed over ground for said each vessel trajectory $trajectory_z$; deleting duplicative AIS data points and segmenting vessel trajectory for each vessel trajectory $trajectory_z$ as follows: for AIS data points therein having a same time stamp, a same longitude, a same latitude, and a same vessel speed over ground, retaining only one thereof, while deleting the others thereof; thereafter segmenting vessel trajectory, starting from index 1 in $trajectory_z$ to obtain a first AIS data point efirst(j−1) and a last AIS data point elast(j) such that AIS data points therebetween satisfying constraint in Expression set (1), continuing till end of index of $trajectory_z$ while deleting all the AIS data points between efirst(j−1) and elast(j), obtaining a new set of vessel trajectories tra=$\{tra_i\}$, i=1, 2, 3, . . . n, wherein $tra_i$ denoting a ith vessel trajectory which i=1, 2, 3, . . . n, each AIS data point of a vessel trajectory $tra_i$ represented by e={MMSI, Time, lon, lat, sog};

$$\begin{cases} sog_j < 1 \\ time_{elast(j)} - time_{efirst(j-1)} > Time_{max} \end{cases} \quad (1)$$

wherein $sog_j$ denoting a speed over ground at a jth AIS data point in a vessel trajectory, $time_{efirst(j-1)}$ denoting a timestamp of an AIS data point efirst(j−1) in a vessel trajectory, $time_{elast(j)}$ denoting a timestamp of an AIS data point elast(j) in a vessel trajectory, and $Time_{max}$ denoting a set time threshold;

(2) identifying adrift AIS data points and missing vessel trajectory segments for each vessel trajectory, repairing the missing vessel trajectory segments with cubic spline interpolation algorithm after deleting the adrift AIS data points, steps for each vessel trajectory $tra_i$ are as follows:

(2.1) calculating a maximum displacement $\Delta d_j$ of adjacent AIS data points $e_{j-1}$ to $e_j$ and a maximum displacement $\Delta d_{j+1}$ of adjacent AIS data points $e_j$ to $e_{j+1}$ according to a set maximum safe driving speed $speed_{max}$ to obtain a maximum longitude displacement value and a maximum latitude displacement value of adjacent AIS data points $e_{j-1}$ to $e_j$ and $e_j$ to $e_{j+1}$, calculating a longitude displacement difference $\Delta lon_j$ and a latitude displacement difference $\Delta lat_j$ from $e_{j-1}$ to $e_j$ and a longitude displacement difference $\Delta lon_{j+1}$ and a latitude displacement difference $\Delta lat_{j+1}$ from $e_j$ to $e_{j+1}$ respectively; an AIS data point $e_j$ being an adrift AIS data point if the longitude displacement difference $\Delta lon_j$, $\Delta lon_{j+1}$ and the latitude displacement difference $\Delta lat_j$, $\Delta lat_{j+1}$ satisfying a constraint of Expression set (2), and deleting the adrift AIS data point $e_j$;

$$\begin{cases} \Delta t_j = \text{Time}_j - \text{Time}_{j-1} \\ \Delta d_j = \text{speed}_{max} * \Delta t_j \\ \Delta lon_j = lon_j - lon_{j-1} \geq \dfrac{\Delta d_j}{\cos 30° * \dfrac{\pi}{180} * 111000} \\ \Delta lat_j = lat_j - lat_{j-1} \geq \dfrac{\Delta d_j}{111000} \\ \Delta t_{j+1} = \text{Time}_{j+1} - \text{Time}_j \\ \Delta d_{j+1} = \text{speed}_{max} * \Delta t_{j+1} \\ \Delta lon_{j+1} = lon_{j+1} - lon_j \geq \dfrac{\Delta d_{j+1}}{\cos 30° * \dfrac{\pi}{180} * 111000} \\ \Delta lat_{j+1} = lat_{j+1} - lat_j \geq \dfrac{\Delta d_{j+1}}{111000} \end{cases} \tag{2}$$

wherein $\Delta t_j$ denoting a time interval from adjacent AIS data points $e_{j-1}$ to $e_j$ in a vessel trajectory, $\text{Time}_{j-1}$ denoting a time stamp of an AIS data point $e_{j-1}$, Time; denoting a time stamp of an AIS data point $e_j$, $\Delta t_{j+1}$ denoting a time interval from adjacent AIS data points $e_{j+1}$ to $e_j$ in a vessel trajectory, $\text{Time}_{j+1}$ denoting a time stamp of an AIS data point $e_{j+1}$;

(2.2) identifying missing vessel trajectory segments with Expression set (3) wherein a time interval $\Delta t$ between adjacent AIS data points being greater than 3 min and less than 5 min;

$$\begin{cases} \Delta t = \text{Time}_{j+1} - \text{Time}_j \\ 3 \text{ min} < \Delta t < 5 \text{ min} \end{cases} \tag{3}$$

(2.3) repairing the missing vessel trajectory segments by cubic spline interpolation algorithm in Eq. (4) subsequent to deletion of the adrift AIS data points in step (2.1) to obtain high-quality AIS data, for each missing vessel trajectory segment as follows: dividing a time series [A, B] of missing vessel trajectory segment into u intervals according to a time interval of 30 seconds, namely $[[x_1, x_2], [x_2, x_3], \ldots, [x_u, x_{u+1}]]$, each sub-time series $[x_1, x_2], [x_2, x_3], \ldots, [x_{u-1}, x_u]$ with 30 seconds time interval, a time interval of a sub-time series $[x_u, x_{u+1}]$ being less than or equal to 30 seconds, $A \leq x_1 < x_2 < \ldots < x_u < x_{u+1} \leq B$; $x_1, x_2, x_3, \ldots, x_{u+1}$ corresponding to function values of $y_1, y_2, y_3, \ldots, y_{u+1}$ with $y_U = S(x_U)$, $(U=1, 2, \ldots, u)$, each sub-time series $[X_U, X_{U+1}]$ satisfying Eq. (4); interpolating a longitude lon and a latitude lat and a vessel speed over ground sog of each time point $x_U$ in the missing vessel trajectory segment, y denoting a longitude lon when interpolating a longitude of a time point, y denoting a latitude lat when interpolating a latitude of a time point, y denoting a vessel speed over ground sog when interpolating a vessel speed over ground of a time point, obtaining a new vessel $\text{track}_i$ after a vessel trajectory repair;

$$S_U(x) = a_U x^3 + b_U x^2 + c_U x + d_U \tag{4}$$

wherein $a_U$, $b_U$, $c_U$, $d_U$ denoting pending coefficients which being derived from the missing vessel trajectory segment;

obtaining a new set of vessel trajectories track=$\{\text{track}_i\}$, i=1, 2, 3, . . . n after processing each vessel trajectory $\text{tra}_i$ in step (2), wherein $\text{track}_i$ denoting a ith vessel trajectory in track which i=1, 2, 3, . . . n, each AIS data point of a vessel trajectory $\text{track}_i$ represented by e={MMSI, Time, lon, lat, sog};

(3) compressing each vessel trajectory $\text{track}_i$ with a Douglas-Peucker algorithm by means of a self-invoking computer program as step (3.3) as follows:

(3.1) forming a set of vessel trajectory points $p=\{p_j(lon_j, lat_j)\}$, j=1, 2, 3, . . . , v from the vessel trajectory $\text{track}_i$, wherein $p_j$ denoting a jth vessel trajectory point for j=1, 2, 3, . . . , v, $lon_j$ denoting a jth longitude value in vessel trajectory point $p_j$, $lat_j$ denoting a jth latitude value in vessel trajectory point $p_j$; converting each vessel trajectory point $p_j$ from longitude and latitude coordinates to a Mercator coordinates vessel trajectory point $m_j$ with Equation set (5), thus obtaining $M=\{m_j(mlon_j, mlat_j)\}$, j=1, 2, 3, . . . , v, wherein M denoting a set of vessel trajectory points in the Mercator coordinate system and $M=\{m_1(mlon_1, mlat_1), m_2(mlon_2, mlat_2), m_3(mlon_3, mlat_3), \ldots, m_v(mlon_v, mlat_v)\}$, $m_j$ denoting a jth vessel trajectory point in the Mercator coordinate system which j=1, 2, 3, . . . , v, $mlon_j$ denoting a jth longitude value in vessel trajectory point $m_j$ in Mercator coordinate system, $mlat_j$ denoting a jth latitude value in vessel trajectory point $m_j$ in the Mercator coordinate system;

$$\begin{cases} \text{radius} = \dfrac{lr * \cos\beta}{\sqrt{1 - E^2 * \sin^2\beta}} \\ q_j = \ln\left(\tan\left(\dfrac{\pi}{4} + \dfrac{lat_j}{2}\right)\left(\dfrac{1 - E * \sin lat_j}{1 + E * \sin lat_j}\right)^2\right) \\ Mlonj_j = \text{radius} * lon_j \\ Mlat_j = \text{radius} * q_j \end{cases} \tag{5}$$

wherein radius denoting a radius of the standard latitude-parallel circle, lr denoting a long radius of Earth's ellipsoid, β a standard latitude in the Mercator projection, E denoting a first eccentricity of Earth's ellipsoid, $q_j$ denoting an equivalent latitude of a jth vessel trajectory point;

(3.2) initiating in respective of the set of vessel trajectory points $M=\{m_1(mlon_1, mlat_1), m_2(mlon_2, mlat_2), m_3(mlon_3, mlat_3), \ldots, m_v(mlon_v, mlat_v)\}$ as follows: denoting r as a set of key vessel trajectory points, putting a starting vessel trajectory point $m_1(mlon_1, mlat_1)$ and an end vessel trajectory point $m_v(mlon_v, mlat_v)$ in the set of vessel trajectory points M as key vessel trajectory points to the set of key vessel trajectory points r in order, obtaining $r=\{m_1(mlon_1, mlat_1), m_v(mlon_v, mlat_v)\}$; connecting the starting vessel trajectory point $m_1(mlon_1, mlat_1)$ and the end vessel trajectory point $m_v(mlon_v, mlat_v)$ in the set of vessel trajectory points M as a straight line $l_{1v}$, calculating distances $dist=\{dist_2, dist_3, \ldots, dist_{v-1}\}$ from all vessel trajectory points between $m_1(mlon_1, mlat_1)$ and $m_v(mlon_v, mlat_v)$ to the straight line $l_{1v}$ with Eq. (6), determining a vessel trajectory point $m_g(mlon_g, mlat_g)$ such that $dist_g = \max\{dist_2, dist_3, \ldots, dist_{v-1}\}$;

$$dist = \frac{|se * ta|}{|se|} \tag{6}$$

wherein dist denoting a vertical distance from a vessel trajectory point to a straight line in the Mercator coordinate system, se denoting a vector from a start of the straight line to an end of the straight line, ta denoting a vector from the start of the straight line to a target point;

concluding step(3.2) on condition $dist_g$ being less than a set compression threshold θ; otherwise, putting the vessel trajectory point $m_g(mlon_g, mlat_g)$ as a key vessel trajectory point to r in order, obtaining $r=\{m_1(mlon_1, mlat_1), m_g(mlon_g, mlat_g), m_v(mlon_v, mlat_v)\}$, dividing the set of vessel trajectory points $M=\{m_1(mlon_1, mlat_1), m_2(mlon_2, mlat_2), m_3(mlon_3, mlat_3), \ldots, m_v(mlon_v, mlat_v)\}$ into two sub vessel trajectory point sets $M_g sub_h$, h=1,2 from $m_1(mlon_1, mlat_1)$ to $m_g(mlon_g, mlat_g)$ and from $m_g(mlon_g, mlat_g)$ to $m_v(mlon_v, mlat_v)$ $M_g sub_1=\{m_1(mlon_1, mlat_1), \ldots, m_g(mlon_g, mlat_g)\}$ and $M_g sub_2=\{m_g(mlon_g, mlat_g), \ldots, m_v(mlon_v, mlat_v)\}$, wherein $M_g sub_1$ denoting a first set of sub vessel trajectory points, $M_g sub_2$ denoting a 2nd set of sub vessel trajectory points; calculating a number of vessel trajectory points $M_g sub_1 number_1$ in $M_g sub_1$ and a number of vessel trajectory points $M_g sub_1 number_2$ in $M_g sub_2$, processing $M_g sub_1$ by step (3.3) if the number of vessel trajectory points $M_g sub_1 number_1$ being greater than a set number threshold μ; processing $M_g sub_2$ by step (3.3) if the number of vessel trajectory points $M_g sub_1 number_2$ being greater than the set number threshold μ;

(3.3) $Mtrack=\{m_{start}(mlon_{start}, mlat_{start}), \ldots, m_{end}(mlon_{end}, mlat_{end})\}$ denoting a sub vessel trajectory point set, $m_{start}(mlon_{start}, mlat_{start})$ denoting a first vessel trajectory point which start=1, 2, 3, . . . , v−1, $m_{end}(mlon_{end}, mlat_{end})$ denoting a last vessel trajectory point which end=2, 3, . . . , v, a subscript start being less than subscript point end; connecting the first point $m_{start}(mlon_{start}, mlat_{start})$ and the last point $m_{end}(mlon_{end}, mlat_{end})$ as a straight line $l_{startend}$, calculating distances $dist=\{dist_{start+1}, dist_{start+2}, \ldots, dist_{end-1}\}$ from all vessel trajectory points between $m_{start}(mlon_{start}, mlat_{start})$ and $m_{end}(mlon_{end}, mlat_{end})$ to the straight line $l_{startend}$ with Eq. (6), determining a vessel trajectory point $m_d(mlon_d, mlat_d)$ such that $dist_d=\max\{dist_{start+1}, dist_{start+2}, \ldots, dist_{end-1}\}$, concluding step (3.3) on condition $dist_d$ being less than the compression threshold θ; otherwise, putting the vessel trajectory point $m_d(mlon_d, mlat_d)$ as a key vessel trajectory point to r, dividing the sub vessel trajectory point set Mtrack into two sub vessel trajectory point sets $M_d sub_h$, h=1,2 from $m_{start}(mlon_{start}, mlat_{start})$ to $m_d(mlon_d, mlat_d)$ and $m_d(mlon_d, mlat_d)$ to $m_{end}(mlon_{end}, mlat_{end})$, $M_d sub_1=\{m_{start}(mlon_{start}, mlat_{start}), \ldots, m_d(mlon_d, mlat_d)\}$ and $M_d sub_2=\{m_d(mlon_d, mlat_d), \ldots, m_{end}(mlon_{end}, mlat_{end})\}$, wherein $M_d sub_1$ denoting a first set of sub vessel trajectory points after splitting the sub vessel trajectory point set Mtrack with the vessel trajectory point $m_d(mlon_d, mlat_d)$ as a split point, $M_d sub_2$ denoting a 2nd set of sub vessel trajectory points after splitting the sub vessel trajectory point set Mtrack with the vessel trajectory point $m_d(mlon_d, mlat_d)$ as a split point; calculating a number of vessel trajectory points $M_d sub_1 number_1$ in $M_d sub_1$ and a number of vessel trajectory points $M_d sub_1 number_2$ in $M_d sub_2$, processing $M_d sub_1$ by step (3.3) if the number of vessel trajectory points $M_d sub_1 number_1$ being greater than a set number threshold μ, processing $M_d sub_2$ by step (3.3) if the number of vessel trajectory points $M_d sub_1 number_2$ being greater than the set number threshold μ until the subscript start greater being than or equal to end;

obtaining a new set of vessel trajectories $R=\{r_i\}$, i=1, 2, 3, . . . n after processing each vessel trajectory $track_i$ in step (3), wherein $r_i$ denoting a vessel trajectory of ith vessel which i=1, 2, 3, . . . n, each vessel trajectory points of vessel trajectory $r_i$ represented by m={mlon, mlat};

(4) reconstructing each vessel trajectory $r_i$ with cubic spline interpolation algorithm, and clustering vessel trajectories into various clusters by Quick Bundles algorithm to form a vessel traffic pattern as follows:

(4.1) reconstructing each vessel trajectory $r_i$ with cubic spline interpolation algorithm, for each vessel trajectory $r_i$ in R, searching a vessel trajectory $r_j$ with most vessel trajectory points, calculating number differences between remaining vessel trajectories and the vessel trajectory $r_j$ trajectory points respectively, and interpolating at the end of each remaining vessel trajectory with cubic spline interpolation algorithm so that each vessel trajectory has same number of trajectory points to obtain a new set of vessel trajectories $T=\{T_i\{t_j(mlon_j, mlat_j)|j=1, 2, 3, \ldots, k\}\}$, i=1, 2, 3, . . . n, wherein $T_i$ denoting an ith vessel trajectory which i=1, 2, 3, . . . n, each vessel trajectory $T_i$ being a K×2 matrix; $t_j$ denoting an jth vessel trajectory point of time order serial number j=1, 2, 3, . . . , k, each vessel trajectory point $t_j$ of a vessel trajectory $T_i$ represented by t={mlon, mlat}; each vessel trajectory $T_i=(t_1, t_2, \ldots, t_k)$ has two ordered polylines, namely an isotropic trajectory $T_i=(t_1, t_2, \ldots t_K)$ and a reverse trajectory flip version $T_{Fi}=(t_K, t_{K-1}, \ldots t_1)$;

(4.2) clustering vessel trajectory $T_i$ into various clusters by Quick Bundles algorithm to form a vessel traffic pattern: constructing a cluster class set of vessel trajectories $C=\{c_q(l, h, s)|q=1, 2, \ldots, W\}$, wherein c, denoting a cluster set of vessel trajectories in cluster q which q=1, 2, . . . , W, I denoting a list of integers indices I=1, 2, 3, . . . , n of vessel trajectories in a set of vessel trajectories T, s denoting a number of vessel trajectories in a cluster, h denoting a vessel trajectory sum in a cluster which being a K×2 matrix and being equal to Eq. (7):

$$h=\sum_{i=1}^{i=s} T_i \tag{7}$$

wherein $T_i$ denoting a K×2 matrix of an ith vessel trajectory, $$\sum_{i=1}^{i=s} T_i$$

denoting a matrix summation;

denoting a centroid vessel trajectory v as shown in Eq. (8):

$$v=h/s \tag{8}$$

denoting a direct distance $d_d$, a flip distance $d_F$ and a minimum average direct-flip distance MDF as shown in Expression set (9):

$$\begin{cases} d_d(P, Q)=\frac{1}{k}\sum_{i=1}^{k}|P_i-Q_i| \\ d_F(P, Q)=d(P, Q_F)=d(P_F, Q) \\ MDF(P, Q)=\min(d_d(P, Q), d_F(P, Q)) \end{cases} \tag{9}$$

wherein $|P_i-Q_i|$ denoting a distance between vessel trajectory point $P_i$ and vessel trajectory point $Q_i$, the direct distance $d_d(P, Q)$ between two vessel trajectories denoting a mean distance between corresponding points of vessel trajectory P and vessel trajectory Q, a flip distance $d_F(P, Q)$ denoting a mean distance between a vessel trajectory and corresponding points of another vessel trajectory after the flip, and the minimum average direct-flip distance MDF(P, Q) denoting a minimum of the direct distance $d_d(P, Q)$ and the flip distance $d_F(P, Q)$;

initiating as follows: selecting a first vessel trajectory $T_1$ and putting it to a first cluster $c_1$, W=1, C={$c_1$}, $c_1$=({1}, $T_1$, 1), obtaining a centroid vessel trajectory $v_1=T_1$ in the first cluster $c_1$ by Eq. (8), for each remaining vessel trajectories in turn T={$T_i$}, i=2, 3, . . . , n which a total number of n−1 vessel trajectories: calculating average direct-flip distances MDF($v_1$, $T_i$) between remaining vessel trajectories $T_i$ and a centroid vessel trajectory $v_1$ with Expression set (9), adding a vessel trajectory $T_d$ with a minimum value MDF($v_1$, $T_d$) in MDF($v_1$, $T_i$) to the first cluster $c_1$ if any average minimum direct flip distances MDF($v_1$, $T_i$) being less than a clustering threshold σ, obtaining $c_1$=({1, d}, $T_1+T_d$, 1+1) and $$v_1 = \frac{T_1 + T_d}{2}$$

in the first cluster $c_1$, for each remaining vessel trajectories in turn T={$T_i$}, i=2, 3, . . . , n which a total number of n−2 vessel trajectories, processing each remaining vessel trajectories $T_i$ by step (4.3); otherwise creating a new cluster $c_2$, selecting a vessel trajectory $T_d$ with a minimum value MDF($v_1$, $T_d$) greater than the clustering threshold σ, $c_2$=({d}, $T_d$, 1), C={$c_1$, $c_2$}, for each remaining vessel trajectories in turn $T_i$={$T_2$, $T_3$, . . . , $T_n$} which a total number of n−2 vessel trajectories, processing each remaining vessel trajectories $T_i$ by step (4.3);

(4.3) calculating minimum direct flip distances MDF($v_e$, $T_i$) between remaining vessel trajectories $T_i$ and a centroid vessel trajectory $v_e$ of all the current clusters $c_e$, e=1, . . . W with Expression set (9); adding vessel trajectory $T_i$ to a cluster $c_e$ with a minimum value for MDF($v_e$, $T_i$), $c_e$=({I,i}, h+$T_i$, s+1) if any average minimum direct flip distances MDF($v_e$, $T_i$) being less than a clustering threshold σ; otherwise creating a new cluster $c_{W+1}$, $c_{W+1}$=({i}, $T_i$, 1), incrementing W by 1; continuing to process steps (4.3) for remaining vessel trajectories $T_i$ in T until T={ }.

The beneficial effects of the present invention are as follows:

A vessel traffic pattern recognition method incorporating data quality control and data compression is applied to vessel traffic pattern recognition.

(1) The invention proposes an abnormal data detection and repair mechanism for AIS trajectory data processing, effectively avoiding the trajectory points that have abnormalities with the channel and timely repairing the missing segments of the trajectory, which can effectively handle the scattered and disordered abnormal trajectory data and provide high-quality AIS data for the identification of vessel traffic patterns;

(2) After compressing the trajectory data by Douglas-Peucker algorithm, the invention uses the minimum direct flip distance to calculate the similarity between trajectories, and uses Quick Bundles algorithm to cluster similar trajectories. The fusion of multiple algorithms used greatly improves the operation efficiency of the computer, reduces the computational overhead in the clustering process, effectively distinguishes the trajectories of different similar segments, aggregates trajectories with high similarity, improves the speed and accuracy of vessel trajectory recognition, and provides a theoretical basis for the research of vessel traffic pattern recognition extraction.

BRIEF DESCRIPTION OF DRAWINGS

In order to illustrate the technical solution of the invention more clearly, the following is a brief description of the accompanying drawings to be used in the description, and it is obvious that the following drawings in the description are embodiments of the invention, from which other drawings can be obtained without creative work for a person of ordinary skill in the art.

EMBODIMENTS

In order to better understand the technical features, objectives and effects of the present invention, the invention is described in more detail below in conjunction with the accompanying drawings. It should be understood that the specific embodiments described herein are intended to explain the invention only and are not intended to limit the patent of the invention. It should be noted that these drawings are in a very simplified form and use non-precise ratios only to facilitate and clearly assist in illustrating the patent of the invention.

Figure 1:
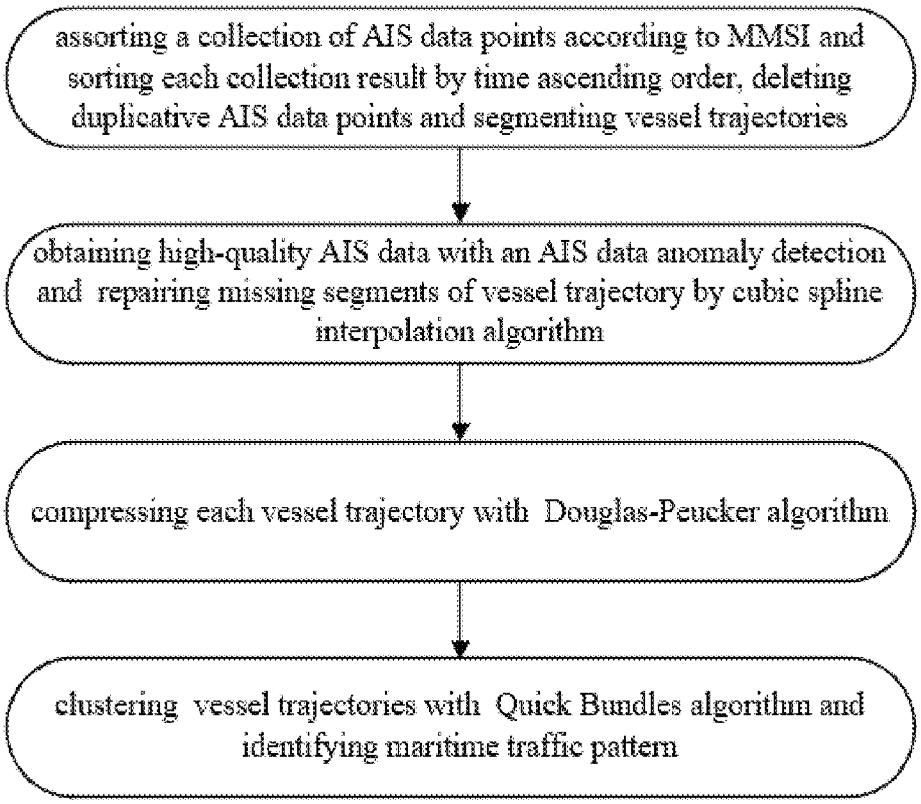
FIG. 1 is schematic diagram of overall process of the method for vessel traffic pattern recognition via data quality control and data compression of the present invention.

A vessel traffic pattern recognition method incorporating data quality control and data compression is shown in FIG. 1 and includes the following steps:

(1) assorting a collection of AIS data points according to MMSI and sorting each collection result by time ascending order to achieve stripping of AIS data points from different vessels: allocating each AIS data point in a collection to a vessel trajectory $trajectory_z$ so that each AIS data point therein having a same MMSI, sorting each vessel trajectory $trajectory_z$ by time ascending order, thus obtaining a set of vessel trajectories $trajectory=\{trajectory_z\}$, z=1, 2, 3, . . . , 243.

In the embodiment, each AIS data point of a vessel trajectory $trajectory_z$ represented by e={MMSI, Time, lon, lat, sog}, MMSI denote a Maritime Mobile Service Identify of vessel, Time denote a time stamp, lon denote a longitude, lat denote a latitude, and sog denote a vessel speed over ground for said each vessel trajectory $trajectory_z$.

A total of 243 vessel trajectories were collected and a partial information of $trajectory_1$ is shown in Table 1.

TABLE 1 partial information of $trajectory_1$

| MMSI | Time | lon | lat | sog |
|---|---|---|---|---|
| 412358280 | 2019 Nov. 2 7:35 | 122.2006 | 30.71712 | 8.4 |
| 412358280 | 2019 Nov. 2 7:36 | 122.2006 | 30.716 | 8.2 |
| 412358280 | 2019 Nov. 20 11:13 | 122.1433 | 30.52977 | 6.5 |
| 412358280 | 2019 Nov. 20 11:14 | 122.1419 | 30.52839 | 6.6 |

Deleting duplicative AIS data points and segmenting vessel trajectory for each vessel trajectory $trajectory_z$ as following: for AIS data points therein having a same time stamp, a same longitude, a same latitude, and a same vessel speed over ground retaining only one thereof, while deleting the others thereof, thereafter segmenting vessel trajectory, starting from index 1 in $trajectory_z$ to obtain a first AIS data point efirst(j−1) and a last AIS data point elast(j) such that AIS data points therebetween satisfying constraint in Expression set (1), continuing till end of index of $trajectory_z$ while deleting all the AIS data points between the first AIS data point efirst(j−1) and the last AIS data point elast(j), and segmenting vessel trajectory $trajectory_z$ with elast(j) as a AIS data first point of a trajectory segment $tra_i$, obtaining a new set of vessel trajectories $tra=\{tra_i\}$, i=1, 2, 3, . . . 403, wherein $tra_i$ denoting a i th vessel trajectory which i=1, 2, 3, . . . 403, each AIS data point of a vessel trajectory $tra_i$ represented by e={MMSI, Time, lon, lat, sog}.

$$\begin{cases} sog_j < 1 \\ time_{elast(j)} - time_{efirst(j-1)} > Time_{max} \end{cases} \quad (1)$$

wherein $sog_j$ denoting a speed over ground at a jth AIS data point in a vessel trajectory, $time_{efirst(j-1)}$ denoting a timestamp of an AIS data point efirst(j−1) in a vessel trajectory, $time_{elast(j)}$ denoting a timestamp of an AIS data point elast(j) in a vessel trajectory, and $Time_{max}$ denoting a set time threshold.

In the embodiment, data from a total of 243 vessels are processed, after vessel trajectory segmentation process, 403 valid vessel trajectories are obtained.

(2) Identifying adrift AIS data points and missing vessel trajectory segments for each vessel trajectory, repairing the missing vessel trajectory segments with cubic spline interpolation algorithm after deleting the adrift AIS data points to obtain high-quality AIS data, steps for each vessel trajectory $tra_i$ are as follows:

(2.1) Setting a maximum safe driving speed of 30 knots, calculating a maximum displacement $\Delta d_j$ of adjacent AIS data points $e_{j-1}$ to $e_j$ and a maximum displacement $\Delta d_{j+1}$ of adjacent AIS data points $e_j$ to $e_{j+1}$ according to the maximum safe driving speed of 30 knots to obtain a maximum longitude displacement value and a maximum latitude displacement value of adjacent AIS data points $e_{j-1}$ to $e_j$ and $e_j$ to $e_{j+1}$, calculating a longitude displacement difference $\Delta lon_j$ and a latitude displacement difference $\Delta lat_j$ from $e_{j-1}$ to $e_j$ and a longitude displacement difference $\Delta lon_{j+1}$ and a latitude displacement difference $\Delta lat_{j+1}$ from $e_j$ to $e_{j+1}$ respectively, a AIS point $e_j$ being a adrift AIS point if the longitude displacement difference $\Delta lon_j$, $\Delta lon_{j+1}$ and the latitude displacement difference $\Delta lat_j$, $\Delta lat_{j+1}$ satisfying a constraint of Expression set (2), and deleting the adrift AIS point $e_j$;

$$\begin{cases} \Delta t_j = \mathrm{Time}_j - \mathrm{Time}_{j-1} \\ \Delta d_j = \mathrm{speed}_{max} * \Delta t_j \\ \Delta lon_j = lon_j - lon_{j-1} \geq \dfrac{\Delta d_j}{\cos 30° * \dfrac{\pi}{180} * 111000} \\ \Delta lat_j = lat_j - lat_{j-1} \geq \dfrac{\Delta d_j}{111000} \\ \Delta t_{j+1} = \mathrm{Time}_{j+1} - \mathrm{Time}_j \\ \Delta d_{j+1} = \mathrm{speed}_{max} * \Delta t_{j+1} \\ \Delta lon_{j+1} = lon_{j+1} - lon_j \geq \dfrac{\Delta d_{j+1}}{\cos 30° * \dfrac{\pi}{180} * 111000} \\ \Delta lat_{j+1} = lat_{j+1} - lat_j \geq \dfrac{\Delta d_{j+1}}{111000} \end{cases} \quad (2)$$

wherein $\Delta t_j$ denoting a time interval from adjacent AIS data points $e_{j-1}$ to $e_j$ in a vessel trajectory, $Time_{j-1}$ denoting a time stamp of an AIS data point $e_{j-1}$, Time; denoting a time stamp of an AIS data point $e_j$, $\Delta t_{j+1}$ denoting a time interval from adjacent AIS data points $e_{j+1}$ to $e_j$ in a vessel trajectory, $Time_{j+1}$ denoting a time stamp of an AIS data point $e_{j+1}$;

(2.2) identifying missing vessel trajectory segments, a vessel trajectory of adjacent AIS data points will be regarded as a trajectory missing segment if a time interval between adjacent AIS data points is greater than 3 min but less than 5 min;

$$\begin{cases} \Delta t = \mathrm{Time}_{j+1} - \mathrm{Time}_j \\ 3 \text{ min} < \Delta t < 5 \text{ min} \end{cases} \quad (3)$$

Figure 6:
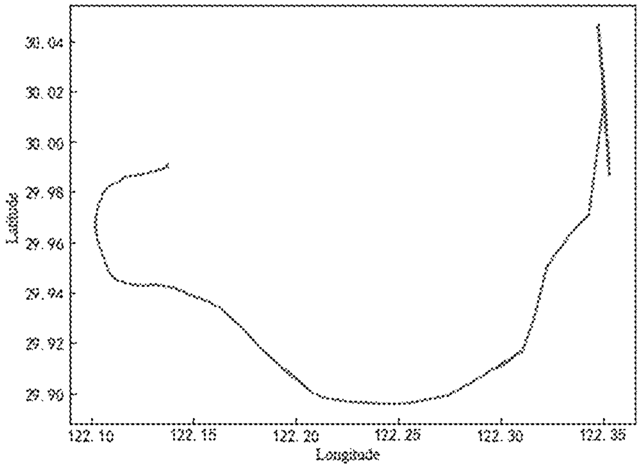
FIG. 6 is an original voyage trajectory of the method for vessel traffic pattern recognition via data quality control and data compression of the present invention.
Figure 7:
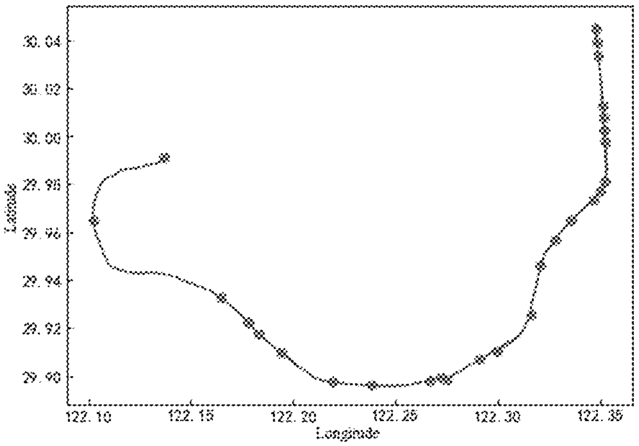
FIG. 7 is a vessel's repaired trajectory of the method for vessel traffic pattern recognition via data quality control and data compression of the present invention, with the dot in the figure showing the missing location of the trajectory detected and repaired based on the AIS update mechanism.

(2.3) repairing the missing vessel trajectory segments by cubic spline interpolation algorithm in Eq. (4) subsequent to deletion of the adrift AIS data points in step (2.1) to obtain high-quality AIS data, for each missing vessel trajectory segment as follows: dividing a time series [A, B] of missing vessel trajectory segment into u intervals according to a time interval of 30 seconds, namely $[[x_1, x_2], [x_2, x_3], \ldots, [x_u, x_{u+1}]]$, each sub-time series $[x_1, x_2], [x_2, x_3], \ldots, [x_{u-1}, x_u]$ with 30 seconds time interval, a time interval of a sub-time series $[x_u, x_{u+1}]$ being less than or equal to 30 seconds, $A \le x_1 < x_2 < \ldots < x_u < x_{u+1} \le B$; $x_1, x_2, x_3, \ldots, x_{u+1}$ corresponding to function values of $y_1, y_2, y_3, \ldots, y_{u+1}$ with $y_U = S(x_U)$, (U=1, 2, . . . , u), each sub-time series $[x_U, X_{U+1}]$ satisfying Eq. (4); interpolating a longitude lon and a latitude lat and a vessel speed over ground sog of each time point $x_U$ in the missing vessel trajectory segment, y denoting a longitude lon when interpolating a longitude of a time point, y denoting a latitude lat when interpolating a latitude of a time point, y denoting a vessel speed over ground sog when interpolating a vessel speed over ground of a time point, obtaining a new vessel $track_i$ after a vessel trajectory repair;

$$S_U(x) = a_U x^3 + b_U x^2 + c_U x + d_U \tag{4}$$

wherein $a_U$, $b_U$, $c_U$, $d_U$ denoting pending coefficients which being derived from the missing vessel trajectory segment;

In the embodiment, processing 403 vessel trajectories are processed to identify 3089 adrift AIS data points and 365 missing vessel trajectory segments, obtaining a new set of vessel trajectories track={$track_i$}, i=1, 2, 3, . . . 403, subsequent to processing of each vessel trajectory $tra_i$ in step (2), wherein $track_i$ denotes an ith vessel trajectory for i=1, 2, 3, . . . 403, each AIS data point of a vessel trajectory $track_i$ represented by e={MMSI, Time, lon, lat, sog} after deleting the adrift AIS data points and repairing missing segments of vessel trajectory by cubic spline interpolation algorithm. The interpolation effect is shown in FIG. 6 and FIG. 7. The dots shown in FIG. 7 are interpolation points. The above effectively identifies and repairs the abnormal data in the vessel trajectory.

Figure 8:
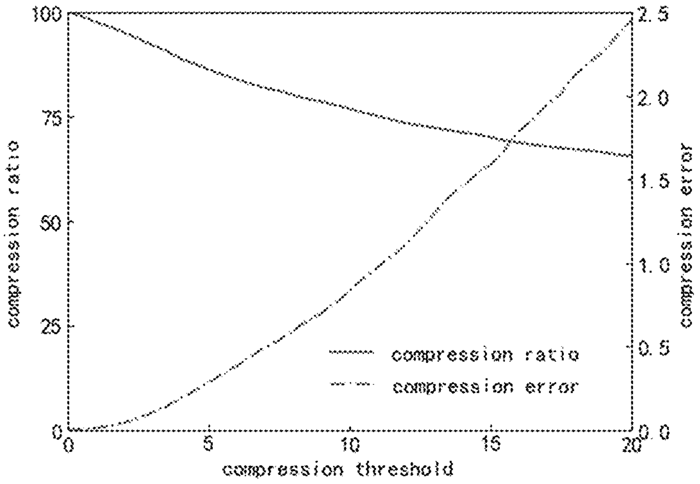
FIG. 8 is a total average compression rate and a total compression error under different compression thresholds of the method for vessel traffic pattern recognition via data quality control and data compression of the present invention.

(3) Compressing each vessel trajectory $track_i$ with a Douglas-Peucker algorithm by means of a self-invoking computer program as step (3.3) (reducing computational expenses in the clustering process of step (4)), as follows:

In the embodiment, to determine an optimal compression threshold of the Douglas-Peucker algorithm, testing a compression effect of the Douglas-Peucker algorithm under a compression threshold of 0 m, 0.5 m, . . . , 20 m respectively, a compression rate being 71.4% and a compression error reaches 1.3 m when increasing the compression threshold to 12 m; with increasing the compression threshold further, a compression rate of the vessel trajectory data changes slowly, but a compression error of the data increases sharply; considering factors such as compression ratio and compression error, setting the compression threshold to 12 m in this embodiment, when the compression threshold being 12 m, a compression ratio being 44% and a compression error being 1.93 m. A total average compression ratio and total compression error under different compression thresholds is shown in FIG. 8. According to the compression threshold 12 m, a compression steps for each vessel trajectory $track_i$ are as follows:

(3.1) Forming a set of vessel trajectory points p={$p_j(lon_j, lat_j)$}, j=1, 2, 3, . . . , v from the vessel trajectory $track_i$, wherein $p_j$ denoting a jth vessel trajectory point for j=1, 2, 3, . . . , v, $lon_j$ denoting a jth longitude value in vessel trajectory point $p_j$, $lat_j$ denoting a jth latitude value in vessel trajectory point $p_j$; converting each vessel trajectory point $p_j$ from longitude and latitude coordinates to a Mercator coordinates vessel trajectory point $m_j$ with Equation set (5), thus obtaining M={$m_j(mlon_j, mlat_j)$}, j=1, 2, 3, . . . , v, wherein M denoting a set of vessel trajectory points in the Mercator coordinate system and M={$m_1(mlon_1, mlat_1)$, $m_2(mlon_2, mlat_2)$, $m_3(mlon_3, mlat_3)$, . . . , $m_v(mlon_v, mlat_v)$}, $m_j$ denoting a jth vessel trajectory point in the Mercator coordinate system which j=1, 2, 3, . . . , v, $mlon_j$ denoting a jth longitude value in vessel trajectory point $m_j$ in Mercator coordinate system, $mlat_j$ denoting a jth latitude value in vessel trajectory point $m_j$ in the Mercator coordinate system;

$$\begin{cases} \text{radius} = \dfrac{lr * \cos\beta}{\sqrt{1 - E^2 * \sin^2\beta}} \\ q_j = \ln\left(\tan\left(\dfrac{\pi}{4} + \dfrac{lat_j}{2}\right)\left(\dfrac{1 - E * \sin lat_j}{1 + E * \sin lat_j}\right)^2\right) \\ Mlonj_j = \text{radius} * lon_j \\ Mlat_j = \text{radius} * q_j \end{cases} \tag{5}$$

wherein radius denoting a radius of the standard latitude-parallel circle, lr denoting a long radius of Earth's ellipsoid, β a standard latitude in the Mercator projection, E denoting a first eccentricity of Earth's ellipsoid, $q_j$ denoting an equivalent latitude of a jth vessel trajectory point;

(3.2) initiating in respective of the set of vessel trajectory points M={$m_1(mlon_1, mlat_1)$, $m_2(mlon_2, mlat_2)$, $m_3(mlon_3, mlat_3)$, . . . , $m_v(mlon_v, mlat_v)$} as follows: denoting r as a set of key vessel trajectory points, putting a starting vessel trajectory point $m_1(mlon_1, mlat_1)$ and an end vessel trajectory point $m_v(mlon_v, mlat_v)$ in the set of vessel trajectory points M as key vessel trajectory points to the set of key vessel trajectory points r in order, obtaining r={$m_1(mlon_1, mlat_1)$, $m_v(mlon_v, mlat_v)$}; connecting the starting vessel trajectory point $m_1(mlon_1, mlat_1)$ and the end vessel trajectory point $m_v(mlon_v, mlat_v)$ in the set of vessel trajectory points M as a straight line $l_{1v}$, calculating distances dist={$dist_2, dist_3, \ldots, dist_{v-1}$} from all vessel trajectory points between $m_1(mlon_1, mlat_1)$ and $m_v(mlon_v, mlat_v)$ to the straight line $l_{1v}$ with Eq. (6), determining a vessel trajectory point $m_g(mlon_g, mlat_g)$ such that $dist_g = \max\{dist_2, dist_3, \ldots, dist_{v-1}\}$;

$$dist = \frac{|se * ta|}{|se|} \tag{6}$$

wherein dist denoting a vertical distance from a vessel trajectory point to a straight line in the Mercator coordinate system, se denoting a vector from a start of the straight line to an end of the straight line, ta denoting a vector from the start of the straight line to a target point;

wherein dist denoting a vertical distance from a vessel trajectory point to a straight line in the Mercator coordinate system, se denoting a vector from a start of the straight line to an end of the straight line, ta denoting a vector from the start of the straight line to a target point;

concluding step(3.2) on condition $dist_g$ being less than a set compression threshold 12 m; otherwise, putting the vessel trajectory point $m_g(mlon_g, mlat_g)$ as a key vessel trajectory point to r in order, obtaining $r=\{m_1(mlon_1, mlat_1), m_g(mlon_g, mlat_g), m_v(mlon_v, mlat_v)\}$, dividing the set of vessel points M=trajectory $\{m_1(mlon_1, mlat_1), m_2(mlon_2, mlat_2), m_3(mlon_3, mlat_3), \ldots, m_v(mlon_v, mlat_v)\}$ into two sub vessel trajectory point sets $M_g sub_h$, h=1,2 from $m_1(mlon_1, mlat_1)$ to $m_g(mlon_g, mlat_g)$ and $m_g(mlon_g, mlat_g)$ to $m_v(mlon_v, mlat_v)$, $M_g sub_1=\{m_1(mlon_1, mlat_1), \ldots, m_g(mlon_g, mlat_g)\}$ from $m_1(mlon_1, mlat_1)$ to $m_g(mlon_g, mlat_g)$ and $M_g sub_2=\{m_g(mlon_g, mlat_g), \ldots, m_v(mlon_v, mlat_v)\}$ form $m_g(mlon_g, mlat_g)$ to $m_v(mlon_v, mlat_v)$, wherein $M_g sub_1$ denoting a first set of sub vessel trajectory points, $M_g sub_2$ denoting a 2nd set of sub vessel trajectory points; calculating a number of vessel trajectory points $M_g sub_1 number_1$ in $M_g sub_1$ and a number of vessel trajectory points $M_g sub_1 number_2$ in $M_g sub_2$, processing $M_g sub_1$ by step (3.3) if the number of vessel trajectory points $M_g sub_1 number_1$ being greater than a set number threshold 50; processing $M_g sub_2$ by step (3.3) if the number of vessel trajectory points $M_g sub_1 number_2$ being greater than the set number threshold 50;

(3.3) Mtrack=$\{m_{start}(mlon_{start}, mlat_{start}), \ldots, m_{end}(mlon_{end}, mlat_{end})\}$ denoting a sub vessel trajectory point set, $m_{start}(mlon_{start}, mlat_{start})$ denoting a first vessel trajectory point which start=1, 2, 3, . . . , v−1, $m_{end}(mlon_{end}, mlat_{end})$ denoting a last vessel trajectory point which end=2, 3, . . . , v, a subscript start being less than subscript point end; connecting the first point $m_{start}(mlon_{start}, mlat_{start})$ and the last point $m_{end}(mlon_{end}, mlat_{end})$ as a straight line $l_{startend}$, calculating distances dist=$\{dist_{start+1}, dist_{start+2}, \ldots, dist_{end-1}\}$ from all vessel trajectory points between $m_{start}(mlon_{start}, mlat_{start})$ and $m_{end}(mlon_{end}, mlat_{end})$ to the straight line $l_{startend}$ with Eq. (6), determining a vessel trajectory point $m_d(mlon_d, mlat_d)$ such that $dist_d=\max\{dist_{start+1}, dist_{start+2}, \ldots, dist_{end-1}\}$, concluding step (3.3) on condition $dist_d$ being less than the compression threshold 12 m; otherwise, putting the vessel trajectory point $m_d(mlon_d, mlat_d)$ as a key vessel trajectory point to r, dividing the sub vessel trajectory point set Mtrack into two sub vessel trajectory point sets $M_d sub_h$, h=1,2 from $m_{start}(mlon_{start}, mlat_{start})$ to $m_d(mlon_d, mlat_d)$ and $m_d(mlon_d, mlat_d)$ to $m_{end}(mlon_{end}, mlat_{end})$, $M_d sub_1=\{m_{start}(mlon_{start}, mlat_{start}), \ldots, m_d(mlon_d, mlat_d)\}$ and $M_d sub_2=\{m_d(mlon_d, mlat_d), \ldots, m_{end}(mlon_{end}, mlat_{end})\}$, wherein $M_d sub_1$ denoting a first set of sub vessel trajectory points after splitting the sub vessel trajectory point set Mtrack with the vessel trajectory point $m_d(mlon_d, mlat_d)$ as a split point, $M_d sub_2$ denoting a 2nd set of sub vessel trajectory points after splitting the sub vessel trajectory point set Mtrack with the vessel trajectory point $m_d(mlon_d, mlat_d)$ as a split point; calculating a number of vessel trajectory points $M_d sub_1 number_1$ in $M_d sub_1$ and a number of vessel trajectory points $M_d sub_1 number_2$ in $M_d sub_2$, processing $M_d sub_1$ by step (3.3) if the number of vessel trajectory points $M_d sub_1 number_1$ being greater than a set number threshold 50, processing $M_d sub_2$ by step (3.3) if the number of vessel trajectory points $M_d sub_1 number_2$ being greater than the set number threshold 50 until the subscript start greater being than or equal to end.

Figure 2:
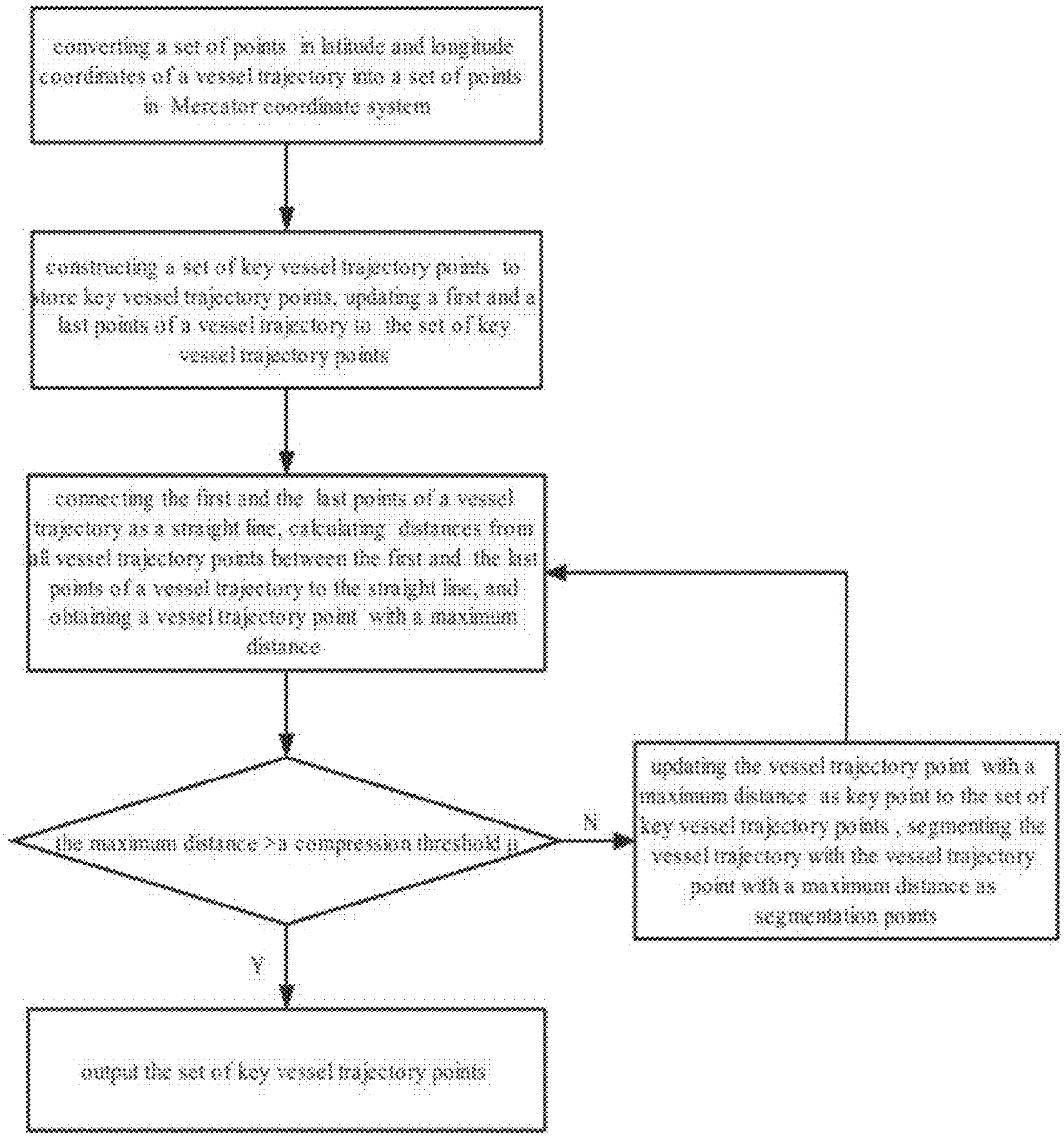
FIG. 2 is a schematic diagram of a single vessel trajectory compression process of the method for vessel traffic pattern recognition via data quality control and data compression of the present invention.
Figure 3:
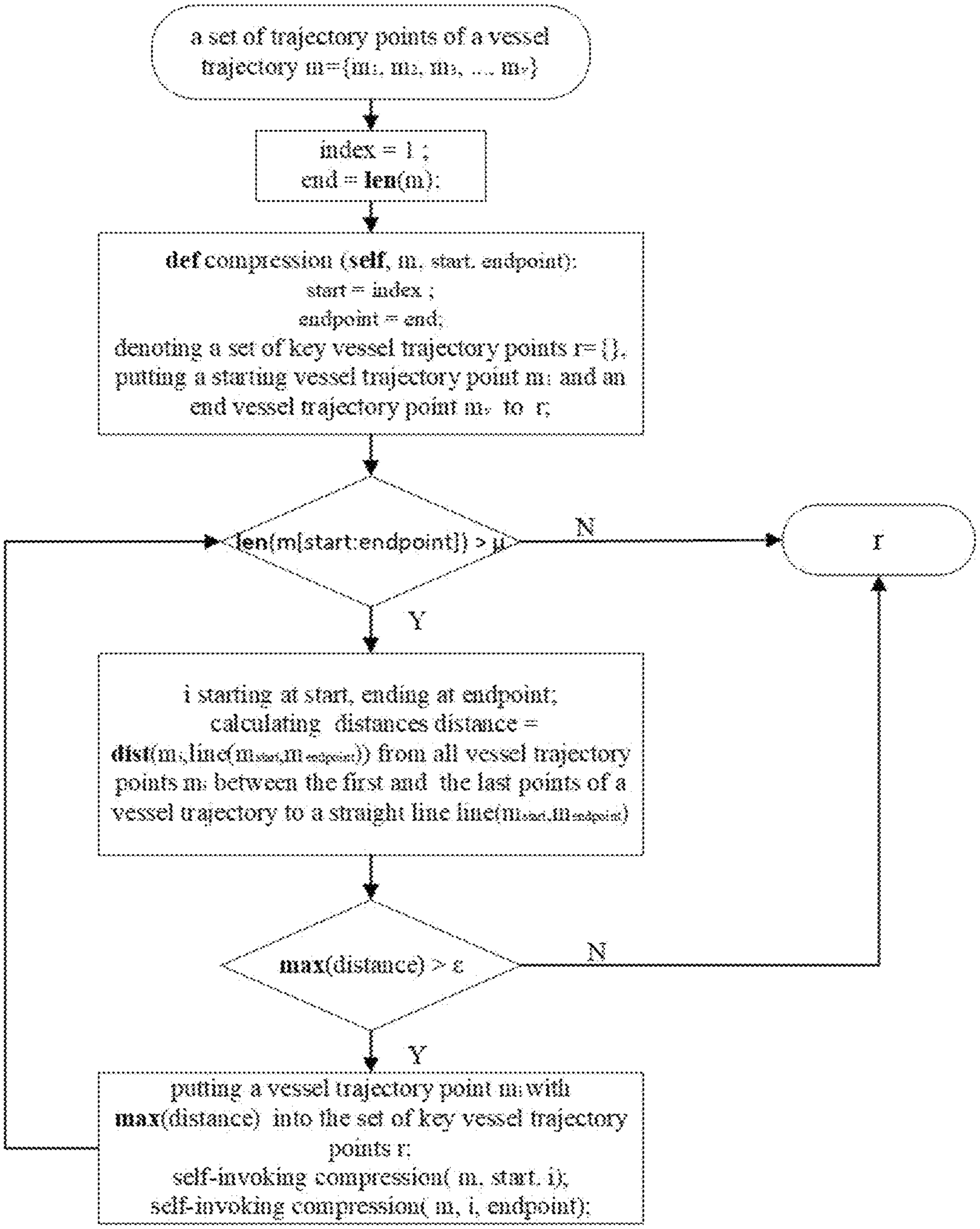
FIG. 3 is a schematic diagram of Douglas-Peucker Pseud-Code process for a single vessel trajectory of the method for vessel traffic pattern recognition via data quality control and data compression of the present invention.
Figure 9:
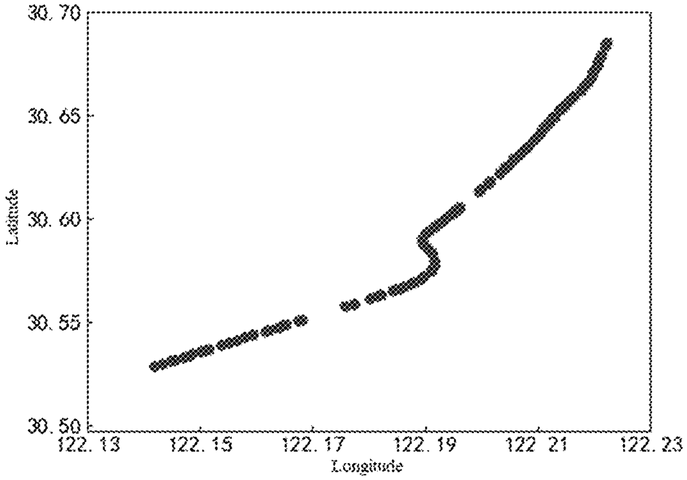
FIG. 9 is a pre-compression vessel trajectory of the method for vessel traffic pattern recognition via data quality control and data compression of the present invention.
Figure 10:
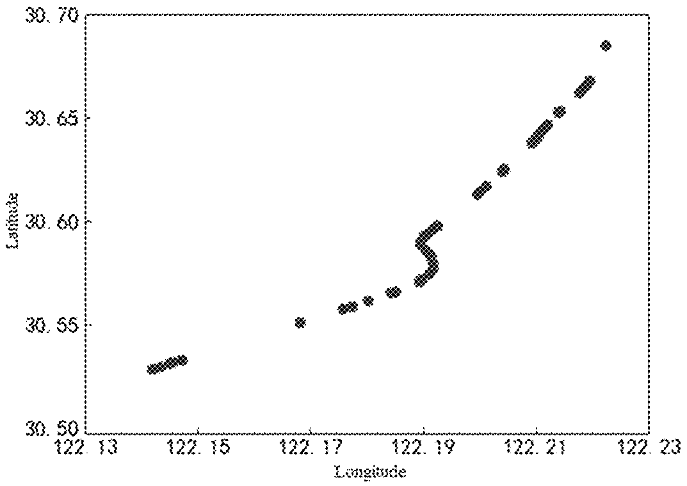
FIG. 10 is a compressed vessel trajectory of the method for vessel traffic pattern recognition via data quality control and data compression of the present invention.

In the embodiment, processing 403 vessel trajectories to obtain a new set of vessel trajectories $R=\{r_i\}$, i=1, 2, 3, . . . 403, wherein $r_i$ denoting a vessel trajectory of ith vessel which i=1, 2, 3, . . . 403, each vessel trajectory points of vessel trajectory $r_i$ represented by m={mlon, mlat}. A schematic diagram of a single vessel trajectory compression process is shown FIG. 2. Douglas-Peucker Pseudo-Code for a vessel trajectory is shown in Table 2. A schematic diagram of Douglas-Peucker Pseud-Code process for a single vessel trajectory is shown FIG. 3. The effect of a single vessel voyage trajectory before compression is shown in FIG. 9, and the effect after compression is shown in FIG. 10.

TABLE 2

Douglas-Peucker Pseudo-Code for a vessel trajectory

```
Algorithm: Douglas-Peucker Pseudo-Code
Input: a set of trajectory points of a vessel trajectory m = {m1, m2, m3, ... , mv}
index = 1
end = len(m)
def compression (self, m, start, endpoint):
    r= {m1, mv} # r denotes a set of key vessel trajectory points
    if len(m[start: endpoint]) > μ then # μ denotes a set number threshold
        dmax = 0
        currentIndex = 1
        for i in range(start + 1, endpoint − 1) do
            distance = dist(mi, line(mstart, mendpoint))
            if distance > dmax then
              dmax = distance
              currentIndex = i
        if dmax > ε then # ε denotes a set compression threshold
            append (r, mi)
            self. compression (m, start, currentIndex)
            self. compression (m, currentIndex, endpoint)
    return r
r = compression (m, index, end)
Output: r
```

Figure 11:
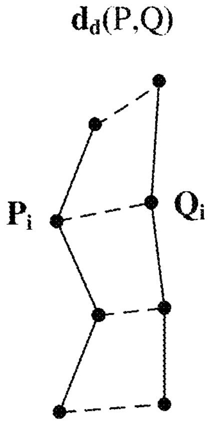
FIG. 11 is a type of vessel trajectory similarity metric in the same direction of the method for vessel traffic pattern recognition via data quality control and data compression of the present invention.
Figure 12:
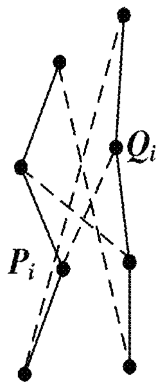
FIG. 12 is a type of ship trajectory similarity metric in the reverse direction of the method for vessel traffic pattern recognition via data quality control and data compression of the present invention.

(4) Reconstructing each vessel trajectory $r_i$ with cubic spline interpolation algorithm, and clustering vessel trajectories into various clusters by Quick Bundles algorithm to form a vessel traffic pattern as follows:

(4.1) reconstructing each vessel trajectory $r_i$ with cubic spline interpolation algorithm, for each vessel trajectory $r_i$ in R, searching a vessel trajectory $r_i$ with most vessel trajectory points, calculating number differences between remaining vessel trajectories and the vessel trajectory $r_j$ trajectory points respectively, and interpolating at the end of each remaining vessel trajectory with cubic spline interpolation algorithm so that each vessel trajectory has same number of trajectory points to obtain a new set of vessel trajectories $T=\{T_i\{t_j$ $(mlon_j, mlat_j)|j=1, 2, 3, \ldots, 4578\}\}$, i=1, 2, 3, . . . 403, wherein $T_i$ denoting an ith vessel trajectory which i=1, 2, 3, . . . 403, each vessel trajectory $T_i$ being a 4578×2 matrix; $t_j$ denoting an jth vessel trajectory point of time order serial number j=1, 2, 3, . . . , 4578, each vessel trajectory point $t_j$ of a vessel trajectory $T_i$ represented by t={mlon, mlat}; each vessel trajectory $T_i=(t_1, t_2, \ldots, t_{4578})$ has two ordered polylines, namely a isotropic trajectory $T_i=(t_1, t_2, \ldots t_{4578})$ and a reverse trajectory flip version $T_{Fi}=(t_{4578}, t_{4578-1}, \ldots t_1)$;

(4.2) clustering vessel trajectories into various clusters by Quick Bundles algorithm to form a vessel traffic pattern: constructing a cluster class set of vessel trajectories $C=\{c_q(l, h, s)|q=1, 2, \ldots, W\}$, wherein $c_q$ denoting a cluster set of vessel trajectories in cluster q which q=1, 2, . . . , W, I denoting a list of integers indices I=1, 2, 3, . . . , 403 of vessel trajectories in a set of vessel trajectories T, s denoting a number of vessel trajectories in a cluster, h denoting a vessel trajectory sum which being a 4578×2 matrix and being equal to Eq. (7):

$$h = \sum_{i=1}^{i=s} T_i \tag{7}$$

wherein $T_i$ denoting a 4578×2 matrix of an ith vessel trajectory, $$\sum_{i=1}^{i=s} T_i$$

denoting a matrix summation;

denoting a centroid vessel trajectory v as shown in Eq. (8):

$$v=h/s \tag{8}$$

denoting a direct distance $d_d$, a flip distance $d_F$ and a minimum average direct-flip distance MDF as shown in Expression set (9):

$$\begin{cases} d_d(P, Q) = \frac{1}{k}\sum_{i=1}^{k}|P_i - Q_i| \\ d_F(P, Q) = d(P, Q_F) = d(P_F, Q) \\ MDF(P, Q) = \min(d_d(P, Q),\ d_F(P, Q)) \end{cases} \tag{9}$$

wherein $|P_i-Q_i|$ denoting a distance between vessel trajectory point $P_i$ and vessel trajectory point $Q_i$, a direct distance $d_d(P, Q)$ between two trajectories denoting a mean distance between corresponding points of vessel trajectory P and vessel trajectory Q, a flip distance $d_F(P, Q)$ denoting a mean distance between a vessel trajectory and corresponding points of another vessel trajectory after the flip, and a minimum direct flip distance MDF(P, Q) denoting a minimum of the direct distance $d_d(P, Q)$ and the flip distance $d_F(P, Q)$;

In the embodiment, calculating a similarity matrix between vessel trajectories uses Equation set (9), a schematic diagram of vessel trajectory similarity metric type is shown in FIG. 11 and FIG. 12. Initiating as follows: selecting a first vessel trajectory $T_1$ and putting it to a first cluster $c_1$, W=1, $C=\{c_1\}$, $c_1=(\{1\}, T_1, 1)$, obtaining a centroid vessel trajectory $v_1=T_1$ in the first cluster $c_1$ by Eq. (8), for each remaining vessel trajectories in turn $T=\{T_i\}$, i=2, 3, . . . , 403 which a total number of 402 vessel trajectories: calculating minimum direct flip distances $MDF(v_1, T_i)$ between remaining vessel trajectories $T_i$ and a centroid vessel trajectory $v_1$ with Equation set (9), adding a vessel trajectory $T_d$ with a minimum value $MDF(v_1, T_d)$ in $MDF(v_1, T_i)$ to the first cluster $c_1$ if any minimum direct flip distances $MDF(v_1, T_i)$ being less than a clustering threshold σ, obtaining $c_1=(\{1, d\}, T_1+T_d, 1+1)$ and $$v_1 = \frac{T_1 + T_d}{2}$$

in the first cluster $c_1$, number of remaining vessel trajectories being 401, processing each remaining vessel trajectories $T_i$ by step (4.3); otherwise creating a new cluster $c_2$, selecting the vessel trajectory $T_d$ with a minimum value $MDF(v_1, T_d)$ greater than the clustering threshold σ, $c_2=(\{d\}, T_d, 1)$, $C=\{c_1, c_2\}$, number of remaining vessel trajectories being 401, processing each remaining vessel trajectories $T_i$ by step (4.3);

(4.3) calculating minimum direct flip distances $MDF(v_e, T_i)$ between remaining vessel trajectories $T_i$ and a centroid vessel trajectory $v_e$ of all the current clusters $c_e$, e=1, . . . M with Equation set (9); adding vessel trajectory $T_i$ to a cluster $c_e$ with a minimum value for $MDF(v_e, T_i)$, $c_e=(\{l, i\}, h+T_i, s+1)$ if any minimum direct flip distances $MDF(v_e, T_i)$ being less than a clustering threshold σ; otherwise creating a new cluster $c_{M+1}$, $c_{M+1}=(\{i\}, T_i, 1)$, incrementing M by 1, continuing to process steps (4.3) for remaining vessel trajectories $T_i$ in T until T={ }.

Figure 4:
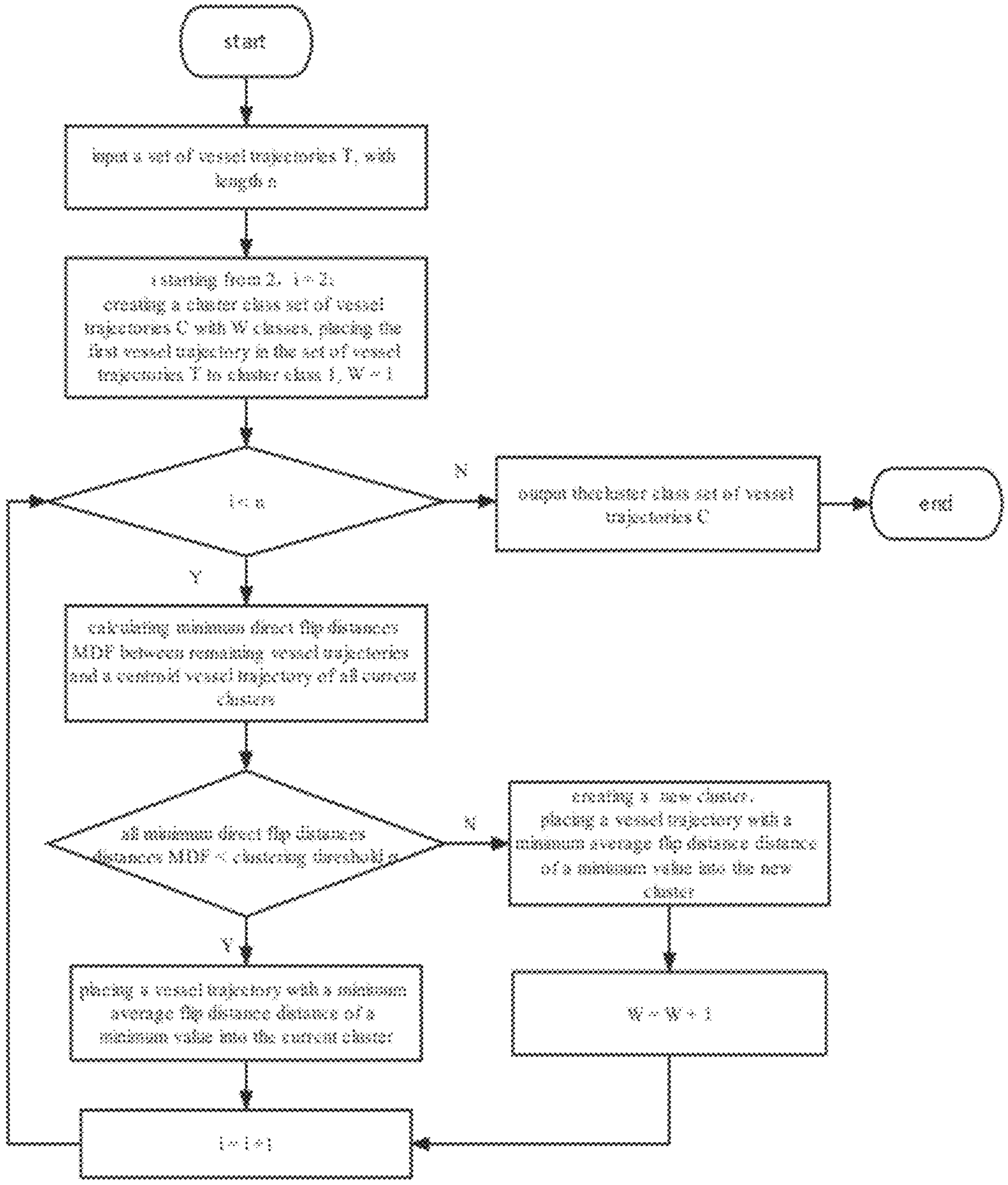
FIG. 4 is a schematic diagram of Quick Bundles algorithm clustering process of the method for vessel traffic pattern recognition via data quality control and data compression of the present invention.
Figure 5:
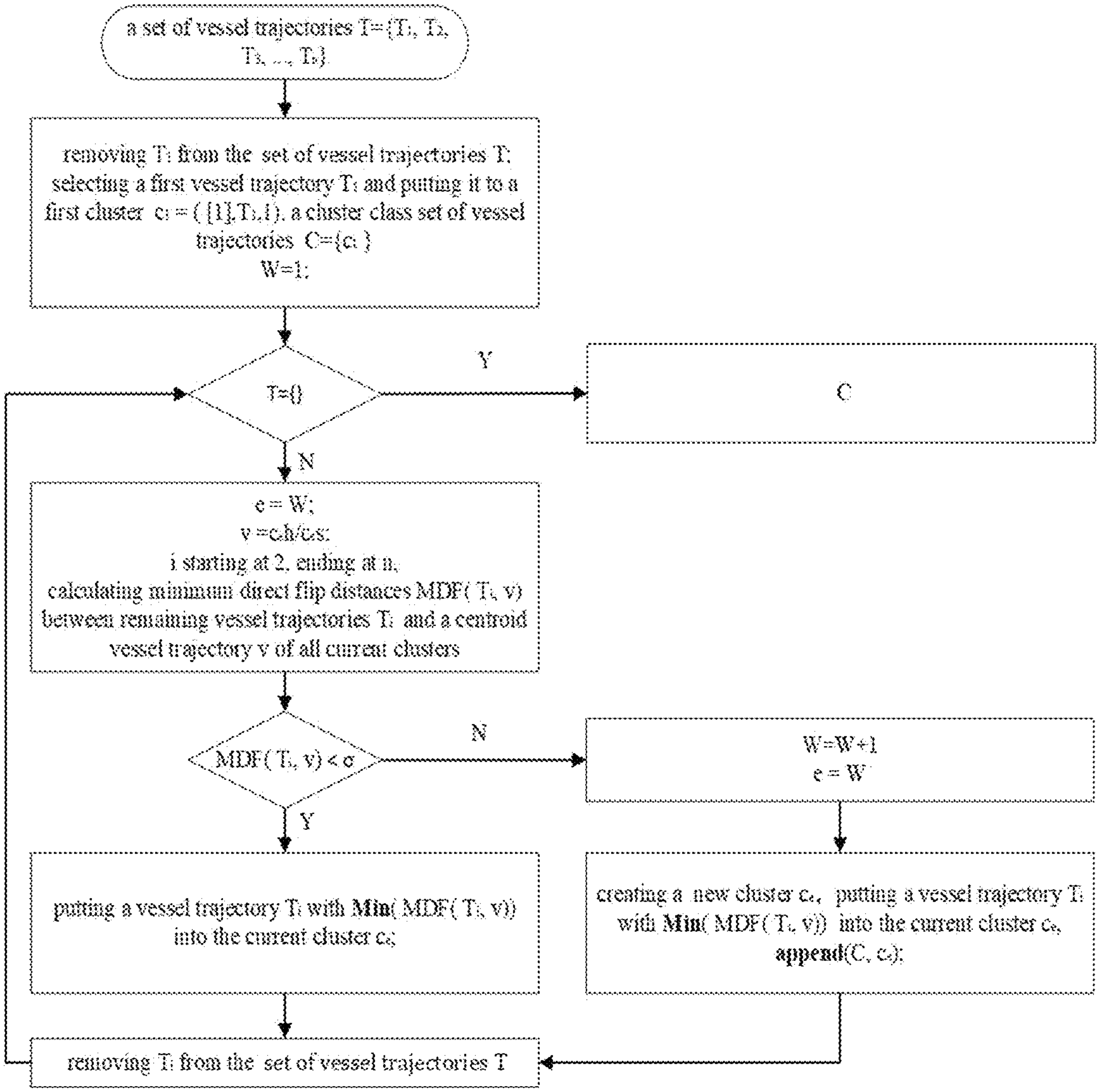
FIG. 5 is a schematic diagram of Quick Bundles Pseud-Code process of the method for vessel traffic pattern recognition via data quality control and data compression of the present invention.
Figure 13:
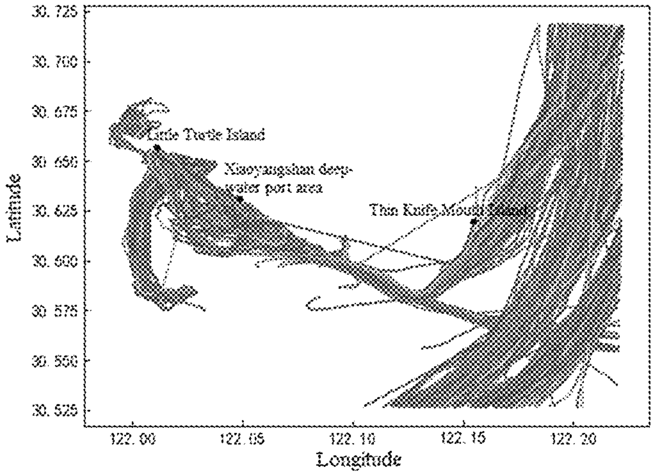
FIG. 13 shows major movement patterns of the vessel in the study area in step (4) of the preferred embodiment of the method for vessel traffic pattern recognition via data quality control and data compression of the present invention.

In the embodiment, 403 vessel trajectories are processed, and are clustered into various clusters by Quick Bundles algorithm to form vessel traffic patterns. A schematic diagram of Quick Bundles algorithm clustering process is shown in FIG. 4. A pseudo-code for Quick Bundles algorithm is shown in Table 4. A schematic diagram of Quick Bundles Pseud-Code process is shown in FIG. 5. A resulting cluster is shown in Table 3. A visualization effect of clustering of this implementation is shown in FIG. 13.

The dataset utilized therefor was collected in Shanghai Yangshan Port in a rectangle from (121.94° E, 30.52° N) to (122.22° E, 30.72° N) were analyzed, comprising AIS observations of vessels from Nov. 1, 2019 to Nov. 30, 2019. The raw dataset contains 1,004,121 pieces of AIS data points. The patterns displayed in FIG. 13 show that: a majority of vessels are more active in the southwest side of Xiaoyangshan deep-water port area and an east side of Bojiazui Island, while relatively few vessels are in the north side of Xiaoyangshan deep-water port area or the northeast side of Little Turtle Island. The results of the embodiment prove the feasibility of the present invention in understanding vessel traffic patterns for maritime factual real-time supervision and in discovering distribution of vessel trajectory activities among scattered and chaotic vessel traffic.

As can be seen thereabove, steps (1), (2), and (3) are pre-processing steps for processing the raw AIS data, that is, the collection of AIS data points, to obtain a set of vessel trajectories as below: $T=\{T_i\{t_j(longitude_j, latitude_j)|j=k\}\}$, wherein $T_i$ denote an ith vessel trajectory which i=1, 2, 3, . . . n, each vessel trajectory $T_i$ is a k×2 matrix; $t_j$ denote an jth vessel trajectory point of time order serial number j=1, 2, 3, . . . k, each vessel trajectory point $t_j$ of a vessel trajectory $T_i$ represented by t={longitude, latitude}. Thereafter, the afore-mentioned set of vessel trajectories is inputted into step (4) to obtain identification of the vessel traffic patterns.

To conclude, step (4) per se works as an independent vessel trajectory clustering process for identification of the vessel traffic patterns.

TABLE 3

Information of some vessel track segments after clustering

| Cluster category W | MMSI |
|---|---|
| Cluster class 1 | 219034000, 219231000, . . . , 636017686, 636018059 |
| Cluster class 2 | 412254253, 412371217, . . . , 412380360, 413595000 |
| Cluster class 3 | 412355690, 412373080, . . . , 413304000, 413557430 |
| Cluster class 4 | 412358240, 412358280, . . . , 413364330, 413368640 |
| Cluster class 5 | 412373080, 412421040, . . . , 412373080, 413557430 |

TABLE 4

Quick Bundles Pseudo-Code

```
Algorithm: Quick Bundles Pseudo-Code
Input: T = {T_1, T_2, T_3, ... , T_n}
c_1 = ([1], T_1, 1) #creating first cluster
C = {c_1}
W = 1
for i = 2 to n do
    t=T_i
    alld=infinity(W)
    flip=zeros(W)
    for e=1 to W do
        v = c_e h/c_e s
        d = d_d (t, v)
          f = d_f(t, v)
          if f<d then
            d=f
            flip=1
          end if
          alld=d
    end for
    m=min(alld)
    1=argmin(alld)
    if m < σ then #σ denote a clustering threshold
        if flip_1 is 1 then
          c_1h = c_1h + t_f
        else
          c_1h = c_1h + t
        end if
        c_1s = c_1s + 1
        append(c_1l, i)
    else
        c_{W+1} = ([i], t, 1)
        append(C, c_{W+1})
        W=W+1
    end if
end for
Output: C = {c_1, c_2, c_3, ... , c_W}
```

As described above, it is only a specific embodiment of the present invention, but the scope of protection of the present invention is not limited to it, and any person skilled in the art can easily think of various equivalent modifications or substitutions within the scope of the technology disclosed herein, which shall be included in the scope of protection of the present invention. Therefore, the scope of protection of the present invention shall be subject to the scope of protection of the claims.

What is claimed is:

1. A method for vessel traffic pattern recognition via data quality control and data compression, comprising the following steps:

(1) assorting a collection of Automatic Identification System (AIS) data points according to MMSI and sorting each collection result by time ascending order, deleting duplicative AIS data points and segmenting vessel trajectories: allocating each AIS data point in a collection to a vessel trajectory $trajectory_z$ so that each point therein having a same MMSI, and sorting each vessel trajectory $trajectory_z$ by time ascending order, thus obtaining a set of vessel trajectories trajectory={$trajectory_z$}, z=1, 2, 3, . . . , w, wherein $trajectory_z$ denoting a zth vessel trajectory which z=1, 2, 3, . . . , w, each AIS data point of a vessel trajectory $trajectory_z$ represented by e={MMSI, Time, lon, lat, sog}, MMSI denoting a Maritime Mobile Service Identity of vessel, Time denoting a time stamp, lon denoting a longitude, lat denoting a latitude, and sog denoting a vessel speed over ground for said each vessel trajectory $trajectory_z$; deleting duplicative AIS data points and segmenting vessel trajectory for each vessel trajectory $trajectory_z$ as follows: for AIS data points therein having a same time stamp, a same longitude, a same latitude, and a same vessel speed over ground, retaining only one thereof, while deleting the others thereof; thereafter segmenting the vessel trajectory $trajectory_z$: starting from index 1 in $trajectory_z$ to obtain a first AIS data point efirst(j−1) and a last AIS data point elast(j) such that AIS data points therebetween satisfying Expression set (1), continuing till end of index of $trajectory_z$ while deleting all the AIS data points between efirst(j−1) and elast(j), segmenting the vessel trajectory $trajectory_z$ at the last AIS data point elast(j); obtaining a new set of vessel trajectories tra={$tra_i$}, i=1, 2, 3, . . . n, wherein $tra_i$ denoting an ith vessel trajectory with each AIS data point of the vessel trajectory $tra_i$ represented by e={MMSI, Time, lon, lat, sog};

$$\begin{cases} sog_j < 1 \\ time_{elast(j)} - time_{efirst(j-1)} > Time_{max} \end{cases} \quad (1)$$

wherein $sog_j$ denoting a speed over ground at a jth AIS data point in the vessel trajectory $trajectory_z$, $time_{efirst(j-1)}$ denoting a timestamp of an AIS data point efirst(j−1) in the vessel trajectory $trajectory_z$, $time_{elast(j)}$; denoting a timestamp of an AIS data point elast(j) in the vessel trajectory $trajectory_z$, and $Time_{max}$ denoting a pre-set time threshold;

(2) identifying adrift AIS data points and missing vessel trajectory segments for each vessel trajectory $tra_i$, repairing the missing vessel trajectory segments with cubic spline interpolation algorithm after deleting the adrift AIS data points for said each vessel trajectory $tra_i$ as follows:

(2.1) deleting an adrift AIS data point $e_j$ which satisfying Expression set (2):

$$\begin{cases} \Delta t_j = Time_j - Time_{j-1} \\ \Delta d_j = speed_{max} * \Delta t_j \\ \Delta lon_j = lon_j - lon_{j-1} \geq \dfrac{\Delta d_j}{\cos 30° * \dfrac{\pi}{180} * 111000} \\ \Delta lat_j = lat_j - lat_{j-1} \geq \dfrac{\Delta d_j}{111000} \\ \Delta t_{j+1} = Time_{j+1} - Time_j \\ \Delta d_{j+1} = speed_{max} * \Delta t_{j+1} \\ \Delta lon_{j+1} = lon_{j+1} - lon_j \geq \dfrac{\Delta d_{j+1}}{\cos 30° * \dfrac{\pi}{180} * 111000} \\ \Delta lat_{j+1} = lat_{j+1} - lat_j \geq \dfrac{\Delta d_{j+1}}{111000} \end{cases} \quad (2)$$

wherein $\Delta t_j$ denoting a time interval from adjacent AIS data points $e_{j-1}$ to $e_j$ in a vessel trajectory, $Time_{j-1}$ denoting a time stamp of an AIS data point $e_{j-1}$, $Time_j$ denoting a time stamp of an AIS data point $e_j$, $\Delta t_{j+1}$ denoting a time interval from adjacent AIS data points $e_{j+1}$ to $e_j$ in a vessel trajectory, $Time_{j+1}$ denoting a time stamp of an AIS data point $e_{j+1}$;

(2.2) identifying missing vessel trajectory segments with Expression set (3) wherein a time interval $\Delta t$ between adjacent AIS data points being greater than 3 min and less than 5 min;

$$\begin{cases} \Delta t = \mathrm{Time}_{j+1} - \mathrm{Time}_j \\ 3\ \mathrm{min} < \Delta t < 5\ \mathrm{min} \end{cases} \tag{3}$$

(2.3) repairing the missing vessel trajectory segments by cubic spline interpolation algorithm in Eq. (4) subsequent to deletion of the adrift AIS data points in step (2.1) to obtain high-quality AIS data, for each missing vessel trajectory segment as follows: dividing a time series [A, B] of missing vessel trajectory segment into u intervals according to a time interval of 30 seconds, namely, $[[x_1, x_2], [x_2, x_3], \ldots, [x_u, x_{u+1}]]$, each sub-time series $[x_1, x_2], [x_2, x_3], \ldots, [x_{u-1}, x_u]$ with 30 seconds time interval, a time interval of a sub-time series $[x_u, x_{u+1}]$ being less than or equal to 30 seconds, $A \le x_1 < x_2 < \ldots < x_u < x_{u+1} \le B$; $x_1, x_2, x_3, \ldots, x_{u+1}$ corresponding to function values of $y_1, y_2, y_3, \ldots y_{u+1}$ with $y_U = S(x_U)$, $(U=1, 2, \ldots, u)$, each sub-time series $[x_U, x_{U+1}]$ satisfying Eq. (4); interpolating a longitude lon and a latitude lat and a vessel speed over ground sog of each time point $x_U$ in the missing vessel trajectory segment, y denoting a longitude lon when interpolating a longitude of a time point, y denoting a latitude lat when interpolating a latitude of a time point, y denoting a vessel speed over ground sog when interpolating a vessel speed over ground of a time point, obtaining a new vessel $track_i$ after a vessel trajectory repair;

$$S_U(x) = a_U x^3 + b_U x^2 + c_U x + d_U \tag{4}$$

wherein $a_U$, $b_U$, $c_U$, $d_U$ denoting pending coefficients which being derived from the missing vessel trajectory segment;

obtaining a new set of vessel trajectories track=($track_i$), i=1, 2, 3, . . . n after processing each vessel trajectories $tra_i$ in step (2), wherein $track_i$ denoting a ith vessel trajectory in track which i=1, 2, 3, . . . n, each AIS data point of a vessel trajectory $track_i$ represented by e={MMSI, Time, lon, lat, sog};

ship vessel trajectories track={$track_i$}, i=1, 2, 3, . . . n potential (3) compressing each vessel trajectory $track_i$ with a Douglas-Peucker algorithm by means of a self-invoking computer program as step (3.3) as follows:

(3.1) forming a set of vessel trajectory points $p=\{p_j(lon_j, lat_j)\}$, j=1, 2, 3, . . . , v from the vessel trajectory $track_i$, wherein $p_j$ denoting a jth vessel trajectory point for j=1, 2, 3, . . . , v, $lon_j$ denoting a jth longitude value in vessel trajectory point $p_j$, $lat_j$ denoting a jth latitude value in vessel trajectory point $p_j$; converting each vessel trajectory point $p_j$ from longitude and latitude coordinates to a Mercator coordinates vessel trajectory point $m_j$ with Equation set (5), thus obtaining $M=\{m_j(mlon_j, mlat_j)\}$, j=1, 2, 3, . . . , v, wherein M denoting a set of vessel trajectory points in the Mercator coordinate system and $M=\{m_1(mlon_1, mlat_1), m_2(mlon_2, mlat_2), m_3(mlon_3, mlat_3), \ldots, m_v(mlon_v, mlat_v)\}$, $m_j$ denoting a jth vessel trajectory point in the Mercator coordinate system which j=1, 2, 3, . . . , v, $mlon_j$ denoting a jth longitude value in vessel trajectory point $m_j$ in Mercator coordinate system, $mlat_j$ denoting a jth latitude value in vessel trajectory point $m_j$ in the Mercator coordinate system;

$$\begin{cases} \text{radius} = \dfrac{lr * \cos\beta}{\sqrt{1 - E^2 * \sin^2\beta}} \\ q_j = \ln\left(\tan\left(\dfrac{\pi}{4} + \dfrac{lat_j}{2}\right)\left(\dfrac{1 - E * \sin lat_j}{1 + E * \sin lat_j}\right)^2\right) \\ Mlonj_j = \text{radius} * lon_j \\ Mlat_j = \text{radius} * q_j \end{cases} \tag{5}$$

wherein radius denoting a radius of the standard latitude-parallel circle, lr denoting a long radius of Earth's ellipsoid, β a standard latitude in the Mercator projection, E denoting a first eccentricity of Earth's ellipsoid, $q_j$ denoting an equivalent latitude of a jth vessel trajectory point;

(3.2) initiating in respective of the set of vessel trajectory points $M=\{m_1(mlon_1, mlat_1), m_2(mlon_2, mlat_2), m_3(mlon_3, mlat_3), \ldots, m_v(mlon_v, mlat_v)\}$ as follows: denoting r as a set of key vessel trajectory points, putting a starting vessel trajectory point $m_1(mlon_1, mlat_1)$ and an end vessel trajectory point $m_v(mlon_v, mlat_v)$ in the set of vessel trajectory points M as key vessel trajectory points to the set of key vessel trajectory points r in order, obtaining $r=\{m_1(mlon_1, mlat_1), m_v(mlon_v, mlat_v)\}$; connecting the starting vessel trajectory point $m_1(mlon_1, mlat_1)$ and the end vessel trajectory point $m_v(mlon_v, mlat_v)$ in the set of vessel trajectory points M as a straight line $l_{1v}$, calculating distances $dist=\{dist_2, dist_3, \ldots, dist_{v-1}\}$ from all vessel trajectory points between $m_1(mlon_1, mlat_1)$ and $m_v(mlon_v, mlat_v)$ to the straight line $l_{1v}$ with Eq. (6), determining a vessel trajectory point $m_g(mlon_g, mlat_g)$ such that $dist_g=\max\{dist_2, dist_3, \ldots, dist_{v-1}\}$;

$$dist = \frac{|se * ta|}{|se|} \tag{6}$$

wherein dist denoting a vertical distance from a vessel trajectory point to a straight line in the Mercator coordinate system, se denoting a vector from a start of the straight line to an end of the straight line, ta denoting a vector from the start of the straight line to a target point;

concluding step (3.2) on condition $dist_g$ being less than a set compression threshold θ; otherwise, putting the vessel trajectory point $m_g(mlon_g, mlat_g)$ as a key vessel trajectory point to r in order, obtaining $r=\{m_1(mlon_1, mlat_1), m_g(mlon_g, mlat_g), m_v(mlon_v, mlat_v)\}$, dividing the set of vessel trajectory points $M=\{m_1(mlon_1, mlat_j), m_2(mlon_2, mlat_2), m_3(mlon_3, mlat_3), \ldots, m_v(mlon_v, mlat_v)\}$ into two sub vessel trajectory point sets $M_g sub_h$, h=1,2 from $m_1(mlon_1, mlat_1)$ to $m_g(mlon_g, mlat_g)$ and from $m_g(mlon_g, mlat_g)$ to $m_v(mlon_v, mlat_v)$, $M_g sub_1=\{m_1(mlon_1, mlat_j), \ldots, m_g(mlon_g, mlat_g)\}$ and $M_g sub_2=\{m_g(mlon_g, mlat_g), \ldots, m_v(mlon_v, mlat_v)\}$, wherein $M_g sub_1$ denoting a first set of sub vessel trajectory points, $M_g sub_2$ denoting a 2nd set of sub vessel trajectory points; calculating a number of vessel trajectory points $M_g sub_1 number_1$ in $M_g sub_1$ and a number of vessel trajectory points $M_g sub_1 number_2$ in $M_g sub_2$, processing $M_g sub_1$ by step (3.3) if the number of vessel trajectory points $M_g sub_1 number_1$ being greater than a set number threshold μ; processing $M_g sub_2$ by step (3.3) if the number of vessel trajectory points $M_g sub_1 number_2$ being greater than the set number threshold μ;

(3.3) Mtrack={$m_{start}(mlon_{start}, mlat_{start})$, . . . , $m_{end}(mlon_{end}, mlat_{end})$} denoting a sub vessel trajectory point set, $m_{start}(mlon_{start}, mlat_{start})$ denoting a first vessel trajectory point which start=1, 2, 3, . . . , v−1, $m_{end}(mlon_{end}, mlat_{end})$ denoting a last vessel trajectory point which end=2, 3, . . . , v, a subscript start being less than subscript point end; connecting the first point $m_{start}(mlon_{start}, mlat_{start})$ and the last point $m_{end}(mlon_{end}, mlat_{end})$ as a straight line $l_{startend}$, calculating distances dist={$dist_{start+1}$, $dist_{start+2}$, . . . , $dist_{end-1}$} from all vessel trajectory points between $m_{start}(mlon_{start}; mlat_{start})$ and $m_{end}(mlon_{end}, mlat_{end})$ to the straight line $l_{startend}$ with Eq. (6), determining a vessel trajectory point $m_d(mlon_d, mlat_d)$ such that $dist_d$=max{$dist_{start+1}$, $dist_{start+2}$ . . . , $dist_{end-1}$}, concluding step (3.3) on condition $dist_d$ being less than the compression threshold θ; otherwise, putting the vessel trajectory point $m_d(mlon_d, mlat_d)$ as a key vessel trajectory point to r, dividing the sub vessel trajectory point set Mtrack into two sub vessel trajectory point sets $M_d sub_h$, h=1,2 from $m_{start}(mlon_{start}, mlat_{start})$ to $m_d(mlon_d, mlat_d)$ and $m_d(mlon_d, mlat_d)$ to $m_{end}(mlon_{end}, mlat_{end})$, $M_d sub_1$={$m_{start}(mlon_{start}, mlat_{start})$, . . . , $m_d(mlon_d, mlat_d)$} and $M_d sub_2$={$m_d(mlon_d, mlat_d)$, . . . , $m_{end}(mlon_{end}, mlat_{end})$}, wherein $M_d sub_1$ denoting a first set of sub vessel trajectory points after splitting the sub vessel trajectory point set Mtrack with the vessel trajectory point $m_d(mlon_d, mlat_d)$ as a split point, $M_d sub_1$ denoting a 2nd set of sub vessel trajectory points after splitting the sub vessel trajectory point set Mtrack with the vessel trajectory point $m_d(mlon_d, mlat_d)$ as a split point; calculating a number of vessel trajectory points $M_d sub_1 number_1$ in $M_d sub_1$ and a number of vessel trajectory points $M_d sub_1 number_2$ in $M_d sub_2$, processing $M_d sub_1$ by step (3.3) if the number of vessel trajectory points $M_d sub_1 number_1$ being greater than a set number threshold μ, processing $M_d sub_2$ by step (3.3) if the number of vessel trajectory points $M_d sub_1 number_2$ being greater than the set number threshold μ until the subscript start greater being than or equal to end;

obtaining a new set of vessel trajectories R={$r_i$}, i=1, 2, 3, . . . n after processing each vessel trajectory $track_i$ in step (3), wherein $r_i$ denoting a vessel trajectory of ith vessel which i=1, 2, 3, . . . n, each vessel trajectory points of vessel trajectory $r_i$ represented by m={mlon, mlat};

(4) reconstructing each vessel trajectory $r_i$ with cubic spline interpolation algorithm, and clustering vessel trajectories into various clusters by Quick Bundles algorithm to form a vessel traffic pattern as follows:

(4.1) reconstructing each vessel trajectory $r_i$ with cubic spline interpolation algorithm, for each vessel trajectory $r_i$ in R, searching a vessel trajectory $r_j$ with most vessel trajectory points, calculating number differences between remaining vessel trajectories and the vessel trajectory $r_j$ trajectory points respectively, and interpolating at an end of each remaining vessel trajectory with cubic spline interpolation algorithm so that each vessel trajectory therein having a same number of trajectory points, obtaining a new set of vessel trajectories T={$T_i${$t_j(mlon_j, mlat_j)$|l=1, 2, 3, . . . , k)}, i=1, 2, 3, . . . n, wherein $T_i$ denoting an ith vessel trajectory which i=1, 2, 3, . . . n, each vessel trajectory $T_i$ being a K×2 matrix; $t_j$ denoting an jth vessel trajectory point of time order serial number j=1, 2, 3, . . . , k, each vessel trajectory point $t_j$ of a vessel trajectory $T_i$ represented by t={mlon, mlat}; each vessel trajectory $T_i=(t_1, t_2, . . . , t_K)$ has two ordered polylines, namely an isotropic trajectory $T_i=(t_1, t_2, . . . t_K)$ and a reverse trajectory flip version $T_{Fi}=(t_K, t_{K-1}, . . . t_1)$;

(4.2) clustering vessel trajectory $T_i$ into various clusters by Quick Bundles algorithm to form a vessel traffic pattern: constructing a cluster class set of vessel trajectories C={$c_q$(l, h, s)|q=1, 2, . . . , W}, wherein $c_q$ denoting a cluster set of vessel trajectories in cluster q which q=1, 2, . . . , W, I denoting a list of integers indices I=1, 2, 3, . . . , n of vessel trajectories in a set of vessel trajectories T, s denoting a number of vessel trajectories in a cluster, h denoting a vessel trajectory sum in a cluster which being a K×2 matrix and being equal to Eq. (7):

$$h = \sum_{i=1}^{i=s} T_i \tag{7}$$

wherein $T_i$ denoting a K×2 matrix of an ith vessel trajectory, $$\sum_{i=1}^{i=s} T_i$$

denoting a matrix summation;

denoting a centroid vessel trajectory v as shown in Eq. (8):

$$v=h/s \tag{8}$$

denoting a direct distance $d_d$, a flip distance $d_F$ and a minimum average direct-flip distance MDF as shown in Expression set (9):

$$\begin{cases} d_d(P, Q) = \frac{1}{k}\sum_{i=1}^{k}|P_i - Q_i| \\ d_F(P, Q) = d(P, Q_F) = d(P_F, Q) \\ MDF(P, Q) = \min(d_d(P, Q), d_F(P, Q)) \end{cases} \tag{9}$$

wherein $|P_i-Q_i|$ denoting a distance between vessel trajectory point $P_i$ and vessel trajectory point $Q_i$, the direct distance $d_d(P, Q)$ between two vessel trajectories denoting a mean distance between corresponding points of vessel trajectory P and vessel trajectory Q, a flip distance $d_F(P, Q)$ denoting a mean distance between a vessel trajectory and corresponding points of another vessel trajectory after the flip, and the minimum average direct-flip distance MDF(P, Q) denoting a minimum of the direct distance $d_d(P, Q)$ and the flip distance $d_F(P, Q)$;

initiating as follows: selecting a first vessel trajectory $T_1$ and putting it to a first cluster $c_1$, W=1, C={$c_1$}, $c_1$=({1}, $T_1$, 1), obtaining a centroid vessel trajectory $v_1=T_1$ in the first cluster $c_1$ by Eq. (8), for each remaining vessel trajectories in turn T={$T_j$}, i=2, 3, . . . , n which a total number of n−1 vessel trajectories: calculating average direct-flip distances MDF($v_1$, $T_i$) between remaining vessel trajectories $T_i$ and a centroid vessel trajectory $v_1$ with Expression set (9), adding a vessel trajectory $T_d$ with a minimum value MDF($v_1$, $T_d$) in MDF($v_1$, $T_i$) to the first cluster $c_1$ if any average minimum direct flip distances $MDF(v_1, T_d)$ being less than a clustering threshold $\sigma$, obtaining $c_1=(\{1, d\}, T_1+T_d, 1+1)$ and $$v_1 = \frac{T_1 + T_d}{2}$$

in the first cluster $c_1$, for each remaining vessel trajectories in turn $T=\{T_i\}$, i=2, 3, . . . , n which a total number of n−2 vessel trajectories, processing each remaining vessel trajectories $T_i$ by step (4.3); otherwise creating a new cluster $c_2$, selecting a vessel trajectory $T_d$ with a minimum value $MDF(v_1, T_d)$ greater than the clustering threshold $\sigma$, $c_2=(\{d\}, T_d, 1)$, $C=\{c_1, c_2\}$, for each remaining vessel trajectories in turn $T_i=\{T_2, T_3, \ldots, T_n\}$ which a total number of n−2 vessel trajectories, processing each remaining vessel trajectories $T_i$ by step (4.3);

(4.3) calculating minimum direct flip distances $MDF(v_e, T_i)$ between remaining vessel trajectories $T_i$ and a centroid vessel trajectory $v_e$ of all the current clusters $c_e$, e=1, . . . W with Expression set (9); adding vessel trajectory $T_i$ to a cluster $c_e$ with a minimum value for $MDF(v_e, T_1)$, $c_e=(\{I, i\}, h+T_1, s+1)$ if any average minimum direct flip distances $MDF(v_e, T_1)$ being less than a clustering threshold $\sigma$; otherwise creating a new cluster $c_{W+1}$, $c_{W+1}=(\{i\}, T_1, 1)$, incrementing W by 1; continuing to process steps (4.3) for remaining vessel trajectories $T_i$ in T until T={ };

(5) for a ship to sail from a starting point to a destination point, with both of which contained in the vessel traffic pattern, selecting a trajectory containing the starting point and the destination point, and sailing the ship following the trajectory from the starting point to the destination point.

* * * * *